(12) United States Patent (10) Patent No.: US 8,881,039 B2
Hammack et al. (45) Date of Patent: Nov. 4, 2014

(54) SCALING COMPOSITE SHAPES FOR A GRAPHICAL HUMAN-MACHINE INTERFACE

(75) Inventors: Stephen G. Hammack, Austin, TX (US); Bruce H. Campney, Pflugerville, TX (US); Stephen C. Gilbert, Austin, TX (US); Adrian A. Sanchez, Manila (PH)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 350 days.

(21) Appl. No.: 12/435,573

(22) Filed: May 5, 2009

(65) Prior Publication Data
US 2010/0235767 A1 Sep. 16, 2010

Related U.S. Application Data

(63) Continuation-in-part of application No. 12/403,812, filed on Mar. 13, 2009, now abandoned.

(51) Int. Cl.
*G06F 3/048* (2013.01)
*G06T 3/00* (2006.01)

(52) U.S. Cl.
CPC .................................. *G06T 3/0012* (2013.01)
USPC ........................................................ 715/764

(58) Field of Classification Search
USPC ........................................................ 715/764
See application file for complete search history.

(56) References Cited

U.S. PATENT DOCUMENTS

| RE30,280 E | 5/1980 | Berman et al. |
|---|---|---|
| 4,244,385 A | 1/1981 | Hotine |
| 4,506,324 A | 3/1985 | Healy |
| 4,512,747 A | 4/1985 | Hitchens et al. |

(Continued)

FOREIGN PATENT DOCUMENTS

| AU | 200071514 B2 | 5/2001 |
|---|---|---|
| CN | 1130430 A | 9/1996 |

(Continued)

OTHER PUBLICATIONS

Search Report or Application No. GB1004051.7, dated Jul. 16, 2010.

(Continued)

*Primary Examiner* — William Bashore
*Assistant Examiner* — Hien Duong
(74) *Attorney, Agent, or Firm* — Marshall, Gerstein & Borun LLP

(57) ABSTRACT

Parameters associated with sub-elements of a composite shape may determine how the sub-element is scaled during resizing of the composite shape. A graphical display editor may use the scaling parameters to calculate various scaling factors that are then applied to the sub-elements of each composite shape during resizing. The editor may apply the scaling parameters to the sub-elements for resizing in one or more axes (e.g., the length, width, and height or X, Y, and Z axes, etc.) to adjust the composite shape for a particular graphical display. The editor may apply the scaling parameters directly to each sub-element to prevent any distortion of those sub-elements. The configured scaling parameters may then be linked to the composite shape so that, at runtime, the parameters are applied to the composite shape and its sub-elements. The scaling parameters may be applied to both composite shapes and animations associated with the composite shapes.

35 Claims, 11 Drawing Sheets

(56) References Cited

U.S. PATENT DOCUMENTS

| | | |
|---|---|---|
| 4,628,435 A | 12/1986 | Tashiro et al. |
| 4,663,704 A | 5/1987 | Jones et al. |
| 4,736,320 A | 4/1988 | Bristol |
| 4,843,538 A | 6/1989 | Lane et al. |
| 4,885,717 A | 12/1989 | Beck et al. |
| 4,972,328 A | 11/1990 | Wu et al. |
| 4,977,529 A | 12/1990 | Gregg et al. |
| 4,985,857 A | 1/1991 | Bajpai et al. |
| 5,014,208 A | 5/1991 | Wolfson |
| 5,021,947 A | 6/1991 | Campbell et al. |
| 5,041,964 A | 8/1991 | Cole et al. |
| 5,051,898 A | 9/1991 | Wright et al. |
| 5,079,731 A | 1/1992 | Miller et al. |
| 5,092,449 A | 3/1992 | Bolin et al. |
| 5,097,412 A | 3/1992 | Orimo et al. |
| 5,119,468 A | 6/1992 | Owens |
| 5,168,441 A | 12/1992 | Onarheim et al. |
| 5,218,709 A | 6/1993 | Fijany et al. |
| 5,268,834 A | 12/1993 | Sanner et al. |
| 5,321,829 A | 6/1994 | Zifferer |
| 5,347,446 A | 9/1994 | Iino et al. |
| 5,347,466 A | 9/1994 | Nichols et al. |
| 5,361,198 A | 11/1994 | Harmon et al. |
| 5,408,412 A | 4/1995 | Hogg et al. |
| 5,408,603 A | 4/1995 | Van de Lavoir et al. |
| 5,421,017 A | 5/1995 | Scholz et al. |
| 5,428,555 A | 6/1995 | Starkey et al. |
| 5,485,600 A | 1/1996 | Joseph et al. |
| 5,485,620 A | 1/1996 | Sadre et al. |
| 5,499,333 A | 3/1996 | Doudnikoff et al. |
| 5,509,116 A | 4/1996 | Hiraga et al. |
| 5,530,643 A | 6/1996 | Hodorowski |
| 5,546,301 A | 8/1996 | Agrawal et al. |
| 5,555,385 A | 9/1996 | Osisek |
| 5,576,946 A | 11/1996 | Bender et al. |
| 5,594,858 A | 1/1997 | Blevins |
| 5,603,018 A | 2/1997 | Terada et al. |
| 5,611,059 A | 3/1997 | Benton et al. |
| 5,631,825 A | 5/1997 | van Weele et al. |
| 5,675,756 A | 10/1997 | Benton et al. |
| 5,680,409 A | 10/1997 | Qin et al. |
| 5,706,455 A | 1/1998 | Benton et al. |
| 5,752,008 A | 5/1998 | Bowling |
| 5,768,119 A | 6/1998 | Havekost et al. |
| 5,782,330 A | 7/1998 | Mehlert et al. |
| 5,796,602 A | 8/1998 | Wellan et al. |
| 5,801,942 A | 9/1998 | Nixon et al. |
| 5,806,053 A | 9/1998 | Tresp et al. |
| 5,812,394 A | 9/1998 | Lewis et al. |
| 5,818,736 A | 10/1998 | Leibold |
| 5,821,934 A | 10/1998 | Kodosky et al. |
| 5,826,060 A | 10/1998 | Santoline et al. |
| 5,828,851 A | 10/1998 | Nixon et al. |
| 5,838,563 A | 11/1998 | Dove et al. |
| 5,841,654 A | 11/1998 | Verissimo et al. |
| 5,862,052 A | 1/1999 | Nixon et al. |
| 5,892,939 A | 4/1999 | Call et al. |
| 5,898,860 A | 4/1999 | Leibold |
| 5,903,455 A | 5/1999 | Sharpe, Jr. et al. |
| 5,909,368 A | 6/1999 | Nixon et al. |
| 5,909,916 A | 6/1999 | Foster et al. |
| 5,926,177 A | 7/1999 | Hatanaka et al. |
| 5,929,855 A | 7/1999 | Benton et al. |
| 5,940,294 A | 8/1999 | Dove |
| 5,950,006 A | 9/1999 | Crater et al. |
| 5,960,214 A | 9/1999 | Sharpe, Jr. et al. |
| 5,970,430 A | 10/1999 | Burns et al. |
| 5,980,078 A | 11/1999 | Krivoshein et al. |
| 5,995,753 A | 11/1999 | Walker |
| 5,995,916 A | 11/1999 | Nixon et al. |
| 6,003,037 A | 12/1999 | Kassabgi et al. |
| 6,023,644 A | 2/2000 | Kinsman |
| 6,028,998 A | 2/2000 | Gloudeman et al. |
| 6,032,208 A | 2/2000 | Nixon et al. |
| 6,041,171 A | 3/2000 | Blaisdell et al. |
| 6,052,130 A | 4/2000 | Bardon et al. |
| 6,078,320 A | 6/2000 | Dove et al. |
| 6,094,600 A | 7/2000 | Sharpe, Jr. et al. |
| 6,098,116 A | 8/2000 | Nixon et al. |
| 6,138,174 A | 10/2000 | Keeley |
| 6,146,143 A | 11/2000 | Huston et al. |
| 6,157,864 A | 12/2000 | Schwenke et al. |
| 6,161,051 A | 12/2000 | Hafemann et al. |
| 6,167,316 A | 12/2000 | Gloudeman et al. |
| 6,173,208 B1 | 1/2001 | Park et al. |
| 6,178,393 B1 | 1/2001 | Irvin |
| 6,192,390 B1 | 2/2001 | Berger et al. |
| 6,195,591 B1 | 2/2001 | Nixon et al. |
| 6,201,996 B1 | 3/2001 | Crater et al. |
| 6,233,586 B1 | 5/2001 | Chang et al. |
| 6,298,454 B1 | 10/2001 | Schleiss et al. |
| 6,362,839 B1 | 3/2002 | Hamilton et al. |
| 6,366,272 B1 | 4/2002 | Rosenberg et al. |
| 6,369,841 B1 | 4/2002 | Salomon et al. |
| 6,385,496 B1 | 5/2002 | Irwin et al. |
| 6,396,516 B1 | 5/2002 | Beatty |
| 6,415,418 B1 | 7/2002 | McLaughlin et al. |
| 6,421,571 B1 | 7/2002 | Spriggs et al. |
| 6,442,512 B1 | 8/2002 | Sengupta et al. |
| 6,442,515 B1 | 8/2002 | Varma et al. |
| 6,445,963 B1 | 9/2002 | Blevins et al. |
| 6,449,624 B1 | 9/2002 | Hammack et al. |
| 6,477,435 B1 | 11/2002 | Ryan et al. |
| 6,477,527 B2 | 11/2002 | Carey et al. |
| 6,480,860 B1 | 11/2002 | Monday |
| 6,510,351 B1 | 1/2003 | Blevins et al. |
| 6,515,683 B1 | 2/2003 | Wright |
| 6,522,934 B1 | 2/2003 | Irwin et al. |
| 6,546,297 B1 | 4/2003 | Gaston et al. |
| 6,571,133 B1 | 5/2003 | Mandl et al. |
| 6,577,908 B1 | 6/2003 | Wojsznis et al. |
| 6,587,108 B1 | 7/2003 | Guerlain et al. |
| 6,615,090 B1 | 9/2003 | Blevins et al. |
| 6,618,630 B1 | 9/2003 | Jundt et al. |
| 6,618,745 B2 | 9/2003 | Christensen et al. |
| 6,633,782 B1 | 10/2003 | Schleiss et al. |
| 6,646,545 B2 | 11/2003 | Bligh |
| 6,647,315 B1 | 11/2003 | Sherriff et al. |
| 6,668,257 B1 | 12/2003 | Greef et al. |
| 6,684,261 B1 | 1/2004 | Orton et al. |
| 6,684,385 B1 | 1/2004 | Bailey et al. |
| 6,687,698 B1 | 2/2004 | Nixon et al. |
| 6,691,280 B1 | 2/2004 | Dove et al. |
| 6,704,737 B1 | 3/2004 | Nixon et al. |
| 6,711,629 B1 | 3/2004 | Christensen et al. |
| 6,760,711 B1 | 7/2004 | Gillett et al. |
| 6,788,980 B1 | 9/2004 | Johnson |
| 6,795,798 B2 | 9/2004 | Eryurek et al. |
| 6,826,521 B1 | 11/2004 | Hess et al. |
| 6,854,111 B1 | 2/2005 | Havner et al. |
| 6,904,415 B2 | 6/2005 | Krahn et al. |
| 6,948,173 B1 | 9/2005 | Isom |
| 6,957,110 B2 | 10/2005 | Wewalaarachchi et al. |
| 6,973,508 B2 | 12/2005 | Shepard et al. |
| 6,980,869 B1 | 12/2005 | Chandhoke |
| 7,043,311 B2 | 5/2006 | Nixon et al. |
| 7,050,083 B2 | 5/2006 | Yoo et al. |
| 7,050,863 B2 | 5/2006 | Mehta et al. |
| 7,065,476 B2 | 6/2006 | Dessureault et al. |
| 7,086,009 B2 | 8/2006 | Resnick et al. |
| 7,110,835 B2 | 9/2006 | Blevins et al. |
| 7,113,834 B2 | 9/2006 | Wojsznis et al. |
| 7,117,052 B2 | 10/2006 | Lucas et al. |
| 7,146,231 B2 | 12/2006 | Schleiss et al. |
| 7,165,226 B2 | 1/2007 | Thurner et al. |
| 7,210,039 B2 | 4/2007 | Rodgers et al. |
| 7,234,138 B2 | 6/2007 | Crevatin |
| 7,308,473 B1 | 12/2007 | Thomas et al. |
| 7,320,005 B2 | 1/2008 | Li et al. |
| 7,330,768 B2 | 2/2008 | Scott et al. |
| 7,376,661 B2 | 5/2008 | Larson |
| 7,404,476 B2 | 7/2008 | Yoshida |
| 7,526,347 B2 | 4/2009 | Lucas et al. |
| 7,647,126 B2 | 1/2010 | Blevins et al. |

(56) References Cited

U.S. PATENT DOCUMENTS

| | | |
|---|---|---|
| 7,647,558 B2 | 1/2010 | Ucar et al. |
| 7,680,546 B2 | 3/2010 | Gilbert et al. |
| 7,702,409 B2 | 4/2010 | Lucas et al. |
| 7,711,959 B2 | 5/2010 | Schmidt et al. |
| 7,734,357 B2 | 6/2010 | Wolf |
| 2001/0007984 A1 | 7/2001 | Fattah et al. |
| 2001/0010053 A1 | 7/2001 | Ben-Shachar et al. |
| 2001/0051949 A1 | 12/2001 | Carey et al. |
| 2002/0004796 A1 | 1/2002 | Vange et al. |
| 2002/0010571 A1 | 1/2002 | Daniel et al. |
| 2002/0019672 A1 | 2/2002 | Paunonen |
| 2002/0022894 A1 | 2/2002 | Eryurek et al. |
| 2002/0022895 A1 | 2/2002 | Genise et al. |
| 2002/0046290 A1 | 4/2002 | Andersson et al. |
| 2002/0055790 A1 | 5/2002 | Havekost |
| 2002/0059282 A1 | 5/2002 | Andersson et al. |
| 2002/0077711 A1 | 6/2002 | Nixon et al. |
| 2002/0123864 A1 | 9/2002 | Eryurek et al. |
| 2002/0156872 A1 | 10/2002 | Brown |
| 2002/0184521 A1 | 12/2002 | Lucovsky et al. |
| 2002/0193888 A1 | 12/2002 | Wewalaarachchi et al. |
| 2002/0199123 A1 | 12/2002 | McIntyre et al. |
| 2003/0005169 A1 | 1/2003 | Perks et al. |
| 2003/0009754 A1 | 1/2003 | Rowley et al. |
| 2003/0014500 A1 | 1/2003 | Schleiss et al. |
| 2003/0028269 A1 | 2/2003 | Spriggs et al. |
| 2003/0028683 A1 | 2/2003 | Yorke et al. |
| 2003/0033037 A1 | 2/2003 | Yuen et al. |
| 2003/0041130 A1 | 2/2003 | Harrisville-Wolff et al. |
| 2003/0084201 A1 | 5/2003 | Edwards et al. |
| 2003/0126136 A1 | 7/2003 | Omoigui |
| 2003/0153988 A1 | 8/2003 | Shepard et al. |
| 2003/0191803 A1 | 10/2003 | Chinnici et al. |
| 2003/0200062 A1 | 10/2003 | Dessureault et al. |
| 2003/0226009 A1 | 12/2003 | Maeda et al. |
| 2003/0236576 A1 | 12/2003 | Resnick et al. |
| 2003/0236577 A1 | 12/2003 | Clinton |
| 2004/0004641 A1 | 1/2004 | Gargi |
| 2004/0021679 A1 | 2/2004 | Chapman et al. |
| 2004/0036698 A1 | 2/2004 | Thurner et al. |
| 2004/0059929 A1 | 3/2004 | Rodgers et al. |
| 2004/0075689 A1 | 4/2004 | Schleiss et al. |
| 2004/0075857 A1 | 4/2004 | Akiyoshi et al. |
| 2004/0078182 A1 | 4/2004 | Nixon et al. |
| 2004/0133487 A1 | 7/2004 | Hanagan et al. |
| 2004/0145593 A1 | 7/2004 | Berkner et al. |
| 2004/0153804 A1 | 8/2004 | Blevins et al. |
| 2004/0162792 A1 | 8/2004 | Satou et al. |
| 2004/0181746 A1 | 9/2004 | McLure et al. |
| 2004/0186927 A1 | 9/2004 | Eryurek et al. |
| 2004/0199925 A1 | 10/2004 | Nixon et al. |
| 2004/0205656 A1 | 10/2004 | Reulein et al. |
| 2004/0249483 A1 | 12/2004 | Wojsznis et al. |
| 2004/0267515 A1 | 12/2004 | McDaniel et al. |
| 2005/0005079 A1 | 1/2005 | Boudou et al. |
| 2005/0015439 A1 | 1/2005 | Balaji et al. |
| 2005/0027376 A1 | 2/2005 | Lucas et al. |
| 2005/0039034 A1 | 2/2005 | Doyle et al. |
| 2005/0062677 A1 | 3/2005 | Nixon et al. |
| 2005/0096872 A1 | 5/2005 | Blevins et al. |
| 2005/0164684 A1 | 7/2005 | Chen et al. |
| 2005/0182758 A1 | 8/2005 | Seitz et al. |
| 2005/0197786 A1 | 9/2005 | Kataria et al. |
| 2005/0197803 A1 | 9/2005 | Eryurek et al. |
| 2005/0197805 A1 | 9/2005 | Eryurek et al. |
| 2005/0197806 A1 | 9/2005 | Eryurek et al. |
| 2005/0217971 A1 | 10/2005 | Kim |
| 2005/0222698 A1 | 10/2005 | Eryurek et al. |
| 2005/0257204 A1 | 11/2005 | Bryant et al. |
| 2005/0277403 A1 | 12/2005 | Schmidt et al. |
| 2006/0031354 A1 | 2/2006 | Patrick et al. |
| 2006/0031481 A1 | 2/2006 | Patrick et al. |
| 2006/0136555 A1 | 6/2006 | Patrick et al. |
| 2006/0259524 A1 | 11/2006 | Horton |
| 2007/0006149 A1 | 1/2007 | Resnick et al. |
| 2007/0061786 A1 | 3/2007 | Zhou et al. |
| 2007/0078529 A1 | 4/2007 | Thiele et al. |
| 2007/0106761 A1 | 5/2007 | Beoughter et al. |
| 2007/0129917 A1 | 6/2007 | Blevins et al. |
| 2007/0130572 A1 | 6/2007 | Gilbert et al. |
| 2007/0132779 A1 | 6/2007 | Gilbert et al. |
| 2007/0150081 A1 | 6/2007 | Nixon et al. |
| 2007/0165031 A1* | 7/2007 | Gilbert et al. ............... 345/473 |
| 2007/0168060 A1 | 7/2007 | Nixon et al. |
| 2007/0168065 A1 | 7/2007 | Nixon et al. |
| 2007/0170037 A1 | 7/2007 | Kuroda |
| 2007/0179641 A1 | 8/2007 | Lucas et al. |
| 2007/0211079 A1 | 9/2007 | Nixon et al. |
| 2007/0214431 A1* | 9/2007 | Amadio et al. ............... 715/788 |
| 2007/0244582 A1 | 10/2007 | Wolf |
| 2007/0282480 A1 | 12/2007 | Pannese et al. |
| 2008/0034367 A1 | 2/2008 | Patrick et al. |
| 2008/0066004 A1 | 3/2008 | Blevins et al. |
| 2008/0116035 A1 | 5/2008 | Ogimura |
| 2008/0140760 A1 | 6/2008 | Conner et al. |
| 2008/0300698 A1 | 12/2008 | Havekost et al. |
| 2009/0009534 A1* | 1/2009 | Perani et al. ............... 345/665 |
| 2009/0249237 A1 | 10/2009 | Jundt et al. |
| 2009/0313569 A1* | 12/2009 | Gibson et al. ............... 715/771 |

FOREIGN PATENT DOCUMENTS

| | | |
|---|---|---|
| EP | 0 482 523 A2 | 4/1992 |
| EP | 0 813 129 | 12/1997 |
| EP | 0 875 826 | 11/1998 |
| EP | 1 030 251 A1 | 8/2000 |
| EP | 1 122 652 | 8/2001 |
| EP | 1 204 033 | 5/2002 |
| EP | 1 284 446 | 2/2003 |
| EP | 1 538 619 A1 | 6/2005 |
| GB | 2 328 523 | 2/1999 |
| GB | 2 370 665 | 7/2000 |
| GB | 2 348 020 | 9/2000 |
| GB | 2 349 958 | 11/2000 |
| GB | 2 355 545 A | 4/2001 |
| GB | 2 371 884 | 8/2002 |
| GB | 2 372 365 | 8/2002 |
| GB | 2 377 045 | 12/2002 |
| GB | 2 395 801 | 6/2004 |
| GB | 2 398 659 | 8/2004 |
| GB | 2 415 809 A | 1/2006 |
| GB | 2 417 574 | 3/2006 |
| GB | 2 417 575 | 3/2006 |
| GB | 2 418 030 | 3/2006 |
| GB | 2 418 031 | 3/2006 |
| JP | 1-298389 | 12/1979 |
| JP | 1-120593 | 5/1989 |
| JP | 2-310602 | 12/1990 |
| JP | 3-257509 | 11/1991 |
| JP | 5-54277 | 3/1993 |
| JP | 6-26093 | 2/1994 |
| JP | 7-036538 | 2/1995 |
| JP | 7-248941 | 9/1995 |
| JP | 8-314760 | 11/1996 |
| JP | 9-134213 | 5/1997 |
| JP | 9-330013 | 12/1997 |
| JP | 11-007315 | 1/1999 |
| JP | 11-007316 | 1/1999 |
| JP | 11-073292 | 3/1999 |
| JP | 2000-050531 | 2/2000 |
| JP | 2000-311004 | 11/2000 |
| JP | 2000-346299 A | 12/2000 |
| JP | 2002-140114 | 5/2002 |
| JP | 2002-215221 | 7/2002 |
| JP | 2002-258936 | 9/2002 |
| JP | 2002-303564 | 10/2002 |
| JP | 2005-275784 A | 10/2005 |
| JP | 9-288512 | 11/2007 |
| WO | WO-91/19237 A1 | 12/1991 |
| WO | WO-95/04314 A1 | 2/1995 |
| WO | WO-97/27540 A1 | 7/1997 |
| WO | WO-97/38362 | 10/1997 |
| WO | WO-97/45778 | 12/1997 |
| WO | WO-98/53398 | 11/1998 |

(56) References Cited

FOREIGN PATENT DOCUMENTS

| | | |
|---|---|---|
| WO | WO-00/23798 | 4/2000 |
| WO | WO-00/70417 | 11/2000 |
| WO | WO-01/09690 | 2/2001 |
| WO | WO-01/65322 A1 | 9/2001 |
| WO | WO-02/071169 | 9/2002 |
| WO | WO-03/003198 | 1/2003 |
| WO | WO 03/038584 | 5/2003 |
| WO | WO-03/048922 A1 | 6/2003 |
| WO | WO-03/075206 A2 | 9/2003 |
| WO | WO-2004/025437 A2 | 3/2004 |
| WO | WO-2004/086160 A1 | 10/2004 |
| WO | WO-2005/107409 | 11/2005 |
| WO | WO-2005/107410 | 11/2005 |
| WO | WO-2005/107416 | 11/2005 |
| WO | WO-2005/109122 | 11/2005 |
| WO | WO-2005/109123 | 11/2005 |
| WO | WO-2005/109124 | 11/2005 |
| WO | WO-2005/109125 | 11/2005 |
| WO | WO-2005/109126 | 11/2005 |
| WO | WO-2005/109127 | 11/2005 |
| WO | WO-2005/109128 | 11/2005 |
| WO | WO-2005/109129 | 11/2005 |
| WO | WO-2005/109130 | 11/2005 |
| WO | WO-2005/109131 | 11/2005 |
| WO | WO-2005/109250 | 11/2005 |
| WO | WO-2005/119381 | 12/2005 |
| WO | WO-2006/090281 A1 | 8/2006 |

OTHER PUBLICATIONS

"Powerful Solutions for Digital Plants", Mimic Simulation v2.6, Mynah Technologies 2003, pp. 1-15.
Arzen, "Using Real-Time Expert Systems for Control System Prototyping," *Proceedings of the International Conference on Systems, Man and Cybernetics*, 3:25-30 (1993).
Bailey, "Elsag Bailey automation", approximately 1993.
Bailey, "Introducing Bailey Evolution 90TM . . . The Sound Investment Strategy for Process Automation", 1993.
Bailey, "Wide-Range, Fully Compatible Family of Process Automation and Management Systems", 1993.
CAMO product datasheet, "The Unscrambler 9.6 " www.camo.com. 2007.
Chen, "Real-Time Management in the Distributed Environment," Ph.D. Thesis (1999).
Computer Products, "Unbundling the DCS", approximately 1992.
Developers.sun.com, "Core J2EE Patterns—Data Access Object," Core J2EE Pattern Catalog (2004). Retrieved from the Internet on Feb. 1, 2006: URL:httC4p://web.archive.org/web/20040414043406/java.sun.com/blueprints/corej2eepatterns/Patterns/c5DataAccessObjects.html.
Fisher-Rosemount Systems, Inc., DeltaV Bulk Edit, pp. 1-12 (2002).
Fisher-Rosemount, "Managing the Process Better", Dec. 1993.
Fisher-Rosemount, "Managing the Process Better", Sep. 1993.
Foldoc, "Declarative Language," Retreived from the Internet on Jul. 30, 2007: URLhttp://ftp.sunet.se/foldoc/foldoc/.cgi?declarative+language.
Han et al., "Web Based rSPC (realtime Statistical Process Control) System Supporting XML Protocol," ISIE, vol. 1, p. 399-403 (2001).
Honeywell "UDC 6000 Process Controller", Aug. 1992.
Honeywell, "Process Manager Specification and Technical Data", Sep. 1991.
Honeywell, "TDC 3000 Overview", approximately 1992.
Honeywell, "TDC 3000 Process Manager", approximately 1992.
Kopp, About.com, C++ Tutorial—Lesson 17: Classes, Members and Methods, Retrieved from the Internet on Apr. 27, 2005: URL:http://www.cplus.about.com/od/beginnerctutorial/l/aa070602a.htm.
Kopp, About.com, C++ Tutorial—Lesson 17: Classes, Members and Methods, Defining Classes, Retrieved from the Internet on Apr. 27, 2005: URL:http://www.cplus.about.com/od/beginnerctutorial/l/aa070602b.htm.
Kopp, About.com, C++ Tutorial—Lesson 17: Classes, Members and Methods, Defining Methods, Retrieved from the Internet on Apr. 27, 2005: URL:http://www.cplus.about.com/od/beginnerctutorial/l/aa070602c.htm.
Kopp, About.com, C++ Tutorial—Lesson 29: Inheritance Introduction, Retrieved from the Internet on Apr. 27, 2005: URL:http://www.cplus.about.com/od/beginnerctutorial/l/aa120502a.htm.
Kopp, About.com, C++ Tutorial—Lesson 29: Inheritance, Retrieved from the Internet on Apr. 27, 2005: URL:http://www.cplus.about.com/od/beginnerctutorial/l/aa120502b.htm.
Kopp, About.com, C++ Tutorial—Lesson 29: Inheritance, Continued, Retrieved from the Internet on Apr. 27, 2005: URL:http://www.cplus.about.com/od/beginnerctutorial/l/aa12050c.htm.
Kopp, About.com, C++ Tutorial—Lesson 9: Introduction to Classes, Defining Classes, Retrieved from the Internet on Apr. 27, 2005: URL:http://www.cplus.about.com/od/beginnerctutorial/l/aa041002b.htm.
Kopp, About.com, C++ Tutorial—Lesson 9: Introduction to Classes, Object Terminology, Retrieved from the Internet on Apr. 27, 2005: URL:http://www.cplus.about.com/od/beginnerctutorial/l/aa041002e.htm.
Kopp, About.com, C++ Tutorial—Lesson 9: Introduction to Classes, Using Objects, Retrieved from the Internet on Apr. 27, 2005: URL:http://www.cplus.about.com/od/beginnerctutorial/l/aa041002d.htm.
Kurpis, "The New IEEE Standard Dictionary of Electrical and Electronics Terms (Including Abstracts of All Current IEEE Standards)," Fifth Ed., Christopher J. Booth, Editor, pp. 317 (1993).
Leeds et al., "Make Your Automation Plan a Reality: MAX 1000", approximately 1990.
Mehta et al., "Feedfoward Neural Networks for Process Identification and Prediction," Neural Network and Experty Systems Presentation (2001).
Mohr et al., "BizTalk and Application Integration—Translating Between Message Specification: BizTalk Mapper," Professional BizTalk, pp. 1-3 (2001).
MSDN Magazine, "A First Look at Writing and Deploying Apps in the Next Generation of Windows," Retrieved from the Internet on Aug. 21, 2007: URL http://msdn. microsoft.com/msdnmag/issues/04/01/DevelopingAppsforLonghorn/?print=true.
MSDN Magazine, "Create Real Apps Using New Code and Markup Model," Retreived from the Interent on Aug. 21, 2007: URL http://msdn.microsoft.com/msdnmag/issues/04/01/avalon/?print=true.
MSDN, "Introduction to Windows Presentation Foundation," (2008), Retreived from the Internet on Aug. 13, 2008: URL: http://msdn.microsoft.com/en-us/library/aa970268(printer).aspx.
Nahavandi et al., "A Virtual Manufacturing Environment with an Element of Reality," *Advanced Factory Automation*, Conf. Pub. 398: 624-629 (1994).
OPC Foundation, "What is OPC?" Retreived from the Internet on Aug. 21, 2007: URL http://www.opcfoundation.org/Default.aspx/01_about/01_whatis.asp?MID=AboutOPC.
Reliance Electric Company, "Multitasking Capability Simplifies Process Control Design", approximately late 1980s, by Angelo J. Nolte.
StatSoft product datasheet, "Statistica, Multivariate Statistical Process Control," www.statsoft.com. (1984-2005).
Sztipanovits et al. "Modeling, Model, Interpretation and Intelligent Control" Proc. of the Third IEEE International Symposium on Intelligent Control, pp. 46-50 (1989).
Toshiba, "Toshiba Integrated Control Systems", Nov. 1990.
Tzovla et al., "Abnormal Condition Management Using Expert Systems," NeuralNetwork and Expert Systems Presentation (2001).
Umetrics product datasheet, "SIMCA-P 11" and "SIMCA-P+ 11," www.umetrics.com. (2005).
W3C, "XSL Transformations (XSLT)," W3C Recommendation, pp. 3 (1999).
Wikipedia, "Application Programming Interface," Retreived from the Interent on Aug. 21, 2007: URL http://en.wikipedia.org/wiki/Application_programming_interface.
Wikipedia, "Extensible Application Markup Language," Retreived from the Internet on Jul. 30, 2007: URL http://en.wikipedia.org/wiki/Extensible_Application_Markup_Language.

(56) References Cited

OTHER PUBLICATIONS ikipedia, "Vector Graphics," Retreived from the Interent on Aug. 21, 2007: URL http://en.wikipedia.org/wiki/Vector_graphics.

Yang, "Design Issues and Implementation of Internet-Based Process Control System," *Control Engineering Practice,* pp. 709-720 (2001).

Chen et al., "Detecting Web Page Structure for Adaptive Viewing on Small Form Factor Devices," Internet Citation, May 2003, XP-002312703, 8 pages.

European Search Report for Application No. 10156430.0-2218 dated Nov. 2, 2011.

Examination Report for European Application No. 10156430.0, dated Feb. 19, 2013.

Examination Report for Application No. GB1004051.7, dated Oct. 22, 2013.

First Office Action for Chinese Application No. 201010134035.6, dated Sep. 27, 2013.

Notice of Reasons for Rejection for Japanese Application No. 2010-057462, dated Feb. 24, 2014.

"Scale (C)" & "Scale Factor (2)," The IEEE Standard Dictionary of Electric and Electronics Terms—Sixth Edition, pp. 946 (1996).

Foley et al., "Computer Graphics Principles and Practice," Computer Graphics, Principles and Practice, Reading, Addison Wesley, pp. 776, 779-793 (1996).

European Examination Report for Application No. 10156430.0, dated Apr. 17, 2014.

\* cited by examiner

SCALING COMPOSITE SHAPES FOR A GRAPHICAL HUMAN-MACHINE INTERFACE

RELATED APPLICATIONS

This application is a continuation-in-part of application Ser. No. 12/403,812, entitled "Scaling Composite Shapes for a Graphical Human-Machine Interface," which was filed on Mar. 13, 2009, the entire contents of which are expressly incorporated by reference herein.

TECHNICAL FIELD

The present invention relates generally to process plants and, more particularly, to the scaling of composite shapes in an editor for graphical representations of components and various activities associated with plant configuration, control, maintenance, and simulation.

DESCRIPTION OF THE RELATED ART

Distributed process control systems, like those used in chemical, petroleum or other processes, typically include one or more process controllers communicatively coupled to one or more field devices via analog, digital or combined analog and digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocols, like the FOUNDATION™ Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being executed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, that are objects in an object oriented programming protocol and perform functions within the control scheme based on inputs thereto and provide outputs to other function blocks within the control scheme. The configuration application may also allow a designer to create or change operator interfaces or human-machine interfaces (HMI) which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As the number and type of control and support applications used in a process control environment have increased, different graphical display applications have been provided to enable users to effectively configure and use these applications. For example, graphical display applications have been used to support control configuration applications to enable a configuration engineer to graphically create control programs to be downloaded to the control devices within a process plant. Additionally, graphical display applications have been used to enable control operators to view the current functioning of the process plant, or areas of the process plant, to enable maintenance personnel to view the state of hardware devices within the process plant, to enable simulation of the process plant, etc.

Some process control configuration applications that are supported by graphical display applications presently include a library of template objects, such as function block template objects and, in some cases, control module template objects, that are used to create a control strategy for a process plant. The template objects have default parameters, settings and methods associated therewith and the engineer using a graphical configuration application can select these template objects and essentially place copies of the selected template objects into a configuration screen to develop a control module. The template objects may also include one or more sub-elements or primitives of the template object. For example, a furnace template object may include a valve, valve fitting, and various text areas as sub-elements. During the process of selecting and placing the template objects into the configuration screen, the engineer interconnects the inputs and outputs of these objects and changes their parameters, names, tags and other parameters to create a specific control module for a specific use in the process plant. After creating one or more such control modules, the engineer can then instantiate the control module and download it to the appropriate controller or controllers and field devices for execution during operation of the process plant.

Thereafter, the engineer may use a different graphical display creation application to create one or more displays for operators, maintenance personnel, etc. within the process plant by selecting and building display objects in the display creation application. These displays are typically implemented on a system wide basis in one or more of the workstations and provide preconfigured displays to the operator or maintenance persons regarding the operating state of the control system or the devices within the plant. These displays generally take the form of alarming displays that receive and display alarms generated by controllers or devices within the process plant, control displays indicating the operating state of the controllers and other devices within the process plant, maintenance displays indicating the functioning state of the devices within the process plant, etc. However, these displays are generally reconfigured to display, in known manners, information or data received from the process control modules or the devices within the process plant. In some systems, displays are created by a graphic depiction that represents a physical or a logical element and that is communicatively tied to the physical or logical element to receive data about the physical or logical element. The graphic on the display screen may change in response to certain events, such as received data to illustrate, for example, that a tank is half full, to illustrate the flow measured by a flow sensor, etc.

Thus, similar to the control configuration application, the display creation application may have template graphical display items, such as tanks, valves, sensors, operator control buttons like slide bars, on/off switches, etc. which may be placed on a screen in any desired configuration to create an operator display, maintenance display and the like. The template graphical display items often include numerous nested sub-elements to create a composite shape. For example, a tank template graphical display includes a pump and that pump may include numerous primary shapes such as an ellipse, rectangles, lines, or other shapes. When placed onto the screen, individual graphic items may be interconnected on the screen in a manner that provides some information or display of the inner-workings of the process plant to users. To animate the graphic display, the display creator must manually tie each of the graphical items to data generated within the process plant, such as data measured by sensors or indicative of valve positions, etc. by specifying a communication link between the graphic item and the relevant data source within the process plant.

Often, many of the same control modules and graphical displays are used for different equipment within the process plant. For example, many medium to large sized process plants have numerous instances of the same or similar equipment that can be controlled and viewed using the same basic general control module and display. To create these numerous control modules and displays, however, a general control module or display module is created and this general control or display module is then copied for each of the different pieces of equipment for which it is applicable. Some techniques for integrating and using a graphic display editor and graphic display elements at a system level of a process control and simulation system may be described in U.S. patent application Ser. No. 10/590,574 entitled "COMPOSITE SHAPE WITH MULTIPLE VISUALIZATIONS IN A PROCESS CONTROL ENVIRONMENT" filed on Aug. 22, 2006, the entire disclosure of which is hereby incorporated by reference herein. These techniques generally enable the creation and use of composite shapes or composite shapes in various activities associated with plant configuration, control, maintenance, and simulation. The composite shapes are re-useable and re-configurable for any process, simulation, or task within the process control system.

During the configuration of a process control and simulation system using a graphic display editor, a designer must create and configure the composite shapes for each representation of the object within the graphic display. For example, to adequately represent a number of process control system components within an operator screen or window of the operator display, a designer often must resize the composite shapes so that they fit within the window, accurately represent the actual component used in the process, ensure the representation is visually appealing to the operator, or that they are in relative size and position to each other to create an accurate and practical operator display or simulation environment for the HMI. Likewise, during runtime, a user may resize a composite shape created during the configuration process (or "congfiguration time") to suit operator preferences or edit the layout of a previously-created display. Often, these composite shapes contain a number of primary shapes (e.g., rectangles, lines, etc.), primitives, sub-elements, and other composite shapes such as valves, pipe fittings, connections, etc., that are constructed of multiple sub-elements, and textual shapes. For example, a tank, boiler, kiln, or other process control system component represented as a composite shape includes any number of sub-elements.

However, past graphic display editors that included functionality to resize composite shapes at configuration time or runtime often distorted visual parameters of the sub-elements. For example, some graphic display editors employed a panel or content decorator that enabled stretching of a composite shape to fill a desired space. One example of a content decorator is the ViewBox class of the Windows® Presentation Foundation which generally permits resizing a composite shape in various dimensions (e.g., X, Y, and Z axes, height, width, and length, etc., singularly or in combination). However, resizing using standard content decorators results in undesirable behaviors. For example, resizing with a ViewBox decorator results in distorted portions of the composite shape and sub-elements become noticeably thicker, stretched, narrow, out of position, or other undesirable visual characteristics. Further, even if an aspect ratio was locked during resizing, while some sub-elements would maintain a proper visual relationship with others, a text portion becomes unsuitably larger or smaller and text or element borders became undesirably thicker and thinner using a ViewBox.

Prior solutions have not specifically addressed the distortions discussed above during resizing of composite shapes and resizing an element with a locked aspect ratio. Images displayed in a user interface window were associated into logical groups. For example, two or more graphical elements may have been grouped together as one logical group. When the user changed a first dimension of a window that displayed several logical groups that are each made up of several graphical elements (i.e., changes some combination of the height or width of the window), the image aspect ratio may be locked and the image resized to the extent the user changed the window dimension. For example, if the user decreased the window height, all of the graphical elements within the several logical groups might become shorter (e.g., for graphical elements that comprised text enclosed in a box, the text reduced in font size and the boxes that enclosed the text became shorter, thus, each logical group, in turn, became shorter and the elements became distorted). However, when a user changed the window's second dimension, the image did not change size, but rather, the number of logical groups changed to accommodate the enlarged or reduced space. If the logical groups were generally aligned along the width of the window, the logical groups did not change shape when the window width was reduced (i.e., the graphical elements and, thus, the logical groups did not get skinnier). Rather, the number of logical groups displayed was reduced, depending on the extent of the reduction in the second dimension. For example, if the user reduced the size of the window that originally displayed five logical groups to an extent that the window only accommodated four and a half logical groups, the number of logical groups displayed may have been truncated to a whole number of groups so as to not change the general dimensions of the objects within the groups.

Other solutions required modification of a "deep copy" of a composite shape. A deep copy may be a file such as a digital graphic image in a JPEG or other format that, apart from simple resizing, is generally regarded as permanent. For example, a composite shape created by a configuration engineer or other user during configuration time may generally be considered a deep copy. Simply resizing the composite shape deep copy resulted in distorted sub-elements, as previously described. Therefore, a user at configuration time would be forced to create a new, undistorted composite shape for each resized instance of the composite shape that was desired for a composite shape library. For example, if both a short tank and a tall tank were desired to be included in the composite shape library, yet both versions of these tanks included inlet and outlet ports that were of equal size, simply creating a short tank and stretching it might result in a tank of a desired height, but with inlet and outlet ports that were stretched as well. The tall tank that was created by stretching the short tank would have at least distorted inlet and outlet ports. Thus, both the normal and tall tanks would have to be created at configuration time. Likewise, if a runtime user desired a different-sized tank to be displayed, the user would be forced edit the composite shape from its original, deep copy format from within a composite shape library by individually modifying each individual sub-element within the composite shape to maintain the proper aspect ratio. Once the desired scale was achieved, the configuration time or runtime user could save the modified composite shape as a new or alternative deep copy of the original composite shape and place that modified element into the display. Continuing with the example, if the user wanted to keep an inlet or outlet port of a tank a standard size, but change the height of the tank itself, the user would have to open and modify the deep copy of the tank composite shape. Any further modifications for other graphic displays would require further modification of the deep copy.

Thus, past graphic display editors have addressed resizing distortions by locking an aspect ratio of the composite shape, resulting in unwanted thickening of lines, stretching of text, truncating the number of displayed sub-elements resulting in a reduction in the amount of information or the amount of the object displayed, and other undesirable distortions. Other methods required modification of a deep copy of the common composite shape for each resizing. As a result, graphical editors, to the extent they existed, have only enabled the user to resize common graphical elements in an "all or nothing" approach that resizes and distorts all sub-elements of a composite shape with a locked aspect ratio, adds or eliminates a number of logical groups within the display window, or requires modification of the composite shape deep copy.

SUMMARY OF DISCLOSURE

Composite shapes are provided for use as portions or components of one or more graphic displays that may be executed in a process plant to display information to users about the process plant environment. Scaling and baseline or unscaled parameters associated with sub-elements of a composite shape may determine how the sub-element is scaled during resizing of the composite shape. A graphical display editor may use the parameters to calculate various scaling factors that are then applied to the sub-elements of each composite shape during resizing. The editor may apply the scaling parameters to the sub-elements for resizing in one or more axes (e.g., the length, width, and height or X, Y, and Z axes, etc.) to adjust the composite shape for a particular graphical display and configuration time or runtime user preference. The editor may apply the scaling factors directly to each sub-element to prevent any distortion of those sub-elements. The scaling parameters of the composite shape's sub-elements may be adjusted during creation of the deep copy at configuration time or may be modified by a user at runtime to control what, if any, effect the scaling factors have in relation to the baseline or unscaled parameters on the composite shape as a whole and its sub-elements individually. The configured scaling parameters may then be linked to the composite shape so that, at both configuration time and runtime, the parameters are applied to the composite shape and its sub-elements during a resizing action. Where a composite shape includes nested composite shapes as sub-elements, the parameters may be applied recursively during a resizing action. The scaling parameters may be applied to both composite shapes and animations.

One example of scaling composite shapes for an operator display in a process control system for use in a process plant may include displaying a composite shape that graphically illustrates an entity within the process plant. The composite shape may include one or more sub-elements, each sub-element including one or more unscaled parameters and each unscaled parameter including one or more scaling parameters. Each scaling parameter may define a resizing behavior of a corresponding sub-element. Scaling may also include resizing the composite shape in one or more dimensions, calculating a scaling factor for each resized dimension, and applying one or more scaling factors to each unscaled parameter associated with a scaling parameter.

A graphic display editor may also be used in a process plant to resize one or more composite shapes that represent one or more of an operation and an entity within the process plant. The graphic display editor may include a library of composite shapes, wherein each of the composite shapes includes a different visual representation of a physical or a logical entity within the process control plant. The composite shape may also include one or more sub-elements. The editor may include a graphically based editor canvas routine that enables a user to define an executable graphic display by placing indications of one or more composite graphic objects from the library of composite graphic objects onto an edit canvas to define a manner in which visual representations of the one or more composite graphic objects will be displayed on a display device to a user during execution of the graphic display. Further, the graphically based editor canvas routine may enable the user to control a scale behavior of each of the component objects of the composite graphic object. Another editor routine may include a scaling canvas routine that may enable the user to associate one or more scaling parameters with one or more sub-elements of a composite shape, wherein each sub-element of the composite shape may be contained within a scaling canvas object and each scaling parameter may define a scaling behavior of a sub-element associated with the composite shape. Also, a composite shape resizing routine may enable the user to modify one or more dimensions of the composite shape within the editor canvas, wherein the modification may be applied to one or more sub-elements of the composite shape according to the associated scaling parameter.

A computer system may be used to scale composite shapes for use in a process control plant, as well. For example, where each composite shape may represent one or more of an operation and an entity within the process plant, the system may include a database with one or more composite shapes and a graphical human-machine interface for displaying a graphical representation of the process plant. The composite shapes within the database may include one or more sub-elements within a scaling canvas object, wherein each sub-element includes one or more unscaled parameters and the a graphical human-machine interface may include a composite shape resizing module for execution on a processor of the computing system. The module may include instructions for configuring, at configuration time, the one or more composite shapes including the one or more scaling parameters and, at runtime, binding each configured composite shape to a configured scaling parameter. Each scaling parameter may define a resizing behavior of a corresponding sub-element of a composite shape. The module may also include instructions for displaying a resized scaling canvas object of the composite shape and the resized scaling canvas object may include one or more changed dimensions. Further, the module may include instructions for calculating a scaling factor for each changed dimension, wherein the scaling factor may include a ratio of one or more changed dimensions of the scaling canvas object to one or more corresponding unscaled parameters. The module instructions may also apply one or more scaling factors to each unscaled parameter of each sub-element that includes a scaling parameter.

DETAILED DESCRIPTION

Figure 1:
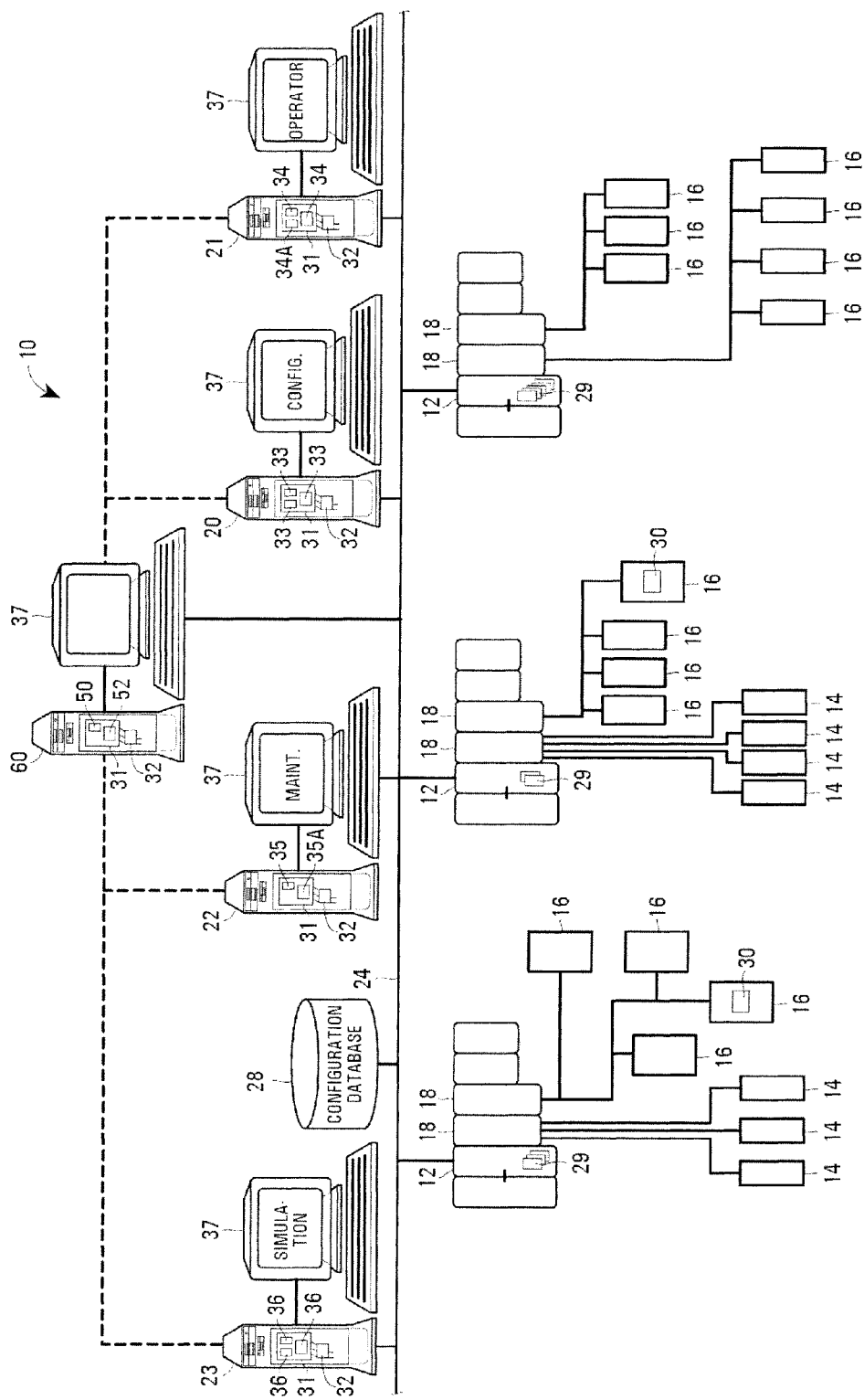
FIG. 1 is a block diagram of a distributed process control network located within a process plant including operator workstations that implement display routines and other applications associated with various functions within the process plant, as well as a workstation that provides system level graphical support that may be used to create and resize composite shapes and graphic displays for each of the various functional areas of the plant.

FIG. 1 illustrates an example process plant 10 in which system level graphical support is provided to various functional areas of the plant 10. As is typical, the process plant 10 includes a distributed process control system having one or more controllers 12, each connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20-23 via a data highway 24 which may be, for example, an Ethernet link. A database 28 may be connected to the data highway 24 and operates as a data historian to collect and store parameter, status and other data associated with the controllers and field devices within the plant 10 and/or as a configuration database that stores the current configuration of the process control system within the plant 10 as downloaded to and stored within the controllers 12 and field devices 14 and 16. The database 28 may additionally store graphical objects created in the manner described herein to provide graphical support within the process plant 10. While the controllers 12, I/O cards 18 and field devices 14 and 16 are typically located down within and distributed throughout the sometimes harsh plant environment, the operator workstations 20-23 and the database 28 are usually located in control rooms or other less harsh environments easily assessable by controller or maintenance personnel. However, in some cases, handheld devices may be used to implement these functions and these handheld devices are typically carried to various places in the plant.

As is known, each of the controllers 12, which may be by way of example, the DeltaV™ controller sold by Emerson Process Management, stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10.

Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of devices. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement process control, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

In the process plant 10 of FIG. 1, the workstations 20-23 may include various applications that are used for various different functions performed by the same or different personnel within the plant 10. Each of the workstations 20-23 includes a memory 31 that stores various applications, programs, data structures, etc. and a processor 32 which may be used to execute any of the applications stored in the memory 31. In the example illustrated in FIG. 1, the workstation 20 is designated as a configuration workstation and includes one or more configuration applications 33 which may include, for example, control module creation applications, operator interface applications and other data structures which can be accessed by any authorized configuration engineer to create and download control routines or modules, such as the control modules 29 and 30, to the various controllers 12 and devices 16 of the plant 10. The workstation 21 is generally illustrated in FIG. 1 as a control operator viewing workstation and includes a number of display applications 34 which may provide a control operator with various displays during operation of the process plant 10 to enable the operator to view and control what is happening within the process plant 10 or in various sections of the plant. The applications 34 may include support applications 34a such as control diagnostic applications, tuning applications, report generation applications or any other control support applications that may be used to assist a control operator in performing control functions. Similarly, the workstation 22 is illustrated as a maintenance viewing workstation and includes a number of maintenance applications 35 that may be used by various maintenance personnel to view the maintenance needs of the plant 10, to view the operating or working condition of various devices 12, 14, 16, etc. Of course, the applications 35 may include support applications 35a such as maintenance diagnostic applications, calibration applications, vibration analysis applications, report generation applications or any other maintenance support applications that may be used to assist a maintenance person in performing maintenance functions within the plant 10. Additionally, the workstation 23 is indicated as a simulation workstation which includes a number of simulation applications 36 that may be used to simulate operation of the plant 10 or various sections of the plant 10 for any number of purposes, including for training purposes, for plant modeling purposes to assist in plant maintenance and control, etc. As is typical, each of the workstations 20-23 includes a display screen 37 along with other standard peripheral devices, like a keyboard, a mouse, etc.

Of course, while the various configuration, control, maintenance and simulation applications 33-36 are illustrated in FIG. 1 as being located in different workstations dedicated to one of those functions, it will be understood that the various applications 33-36 associated with these or other plant functions may be located in and executed in the same or different workstations or computers within the plant 10, depending on the needs and set up of the plant 10. Thus, for example, one or more simulation applications 36 and control applications 33 may be executed in the same workstation 20-23, while different individual simulation applications 36 or different individual control applications 33 may be executed in different ones of the workstations 20-23.

As described in U.S. patent application Ser. No. 10/590, 574, to alleviate the inefficiency of different graphics editors and packages for each plant level, and to provide for more widely usable and understandable graphics within the plant 10, a graphical support layer is provided at a system level of the process plant 10 to support the graphic display and data structure needs of each of the various functional areas of the plant 10, including the configuration, operator viewing, maintenance viewing, simulation and other functional areas of the plant 10. This system level of support is depicted diagrammatically in FIG. 2, which illustrates a plant operational level 40, a plant functional level 42 and a system level 44. As will be understood from FIG. 2, the plant operational level 40 includes the controllers 12, field devices 14, 16, etc. which execute the control routines or modules 29 and 30, as well as other software run within the plant 10 to implement plant operations during runtime of the plant. The plant functional level 42 is depicted as including a configuration function block 46, a control function block 47, a maintenance function block 48 and a simulation block 49, although other or different functions, such as an engineering and a business function, could be provided as well. The configuration function block 46 implements the configuration routines 33 which interface or communicate with components within the plant operational level 40 to provide control strategies or control modules thereto. The control function block 47 includes the control viewing and other applications 34 and 34a which also interface or communicate typically directly with the various physical and logical components within the plant operational level 40 to implement operator initiated changes within the plant 10, to provide information to the operator via control displays 34, to acquire data for the control applications 34a, etc. The maintenance function block 48 includes the maintenance routines and applications 35 and 35a that interface or communicate with various physical and logical components within the plant operational level 40 to implement maintenance procedures, to collect maintenance data, to provide maintenance data or information to a maintenance person via maintenance displays 35, to run diagnostic applications 35a, etc. Likewise, the simulation function block 49 includes simulation routines 36 which implement simulations of the plant 10 and which may be communicatively coupled to components within the plant operational level 40 to obtain data regarding the plant 10.

Figure 2:
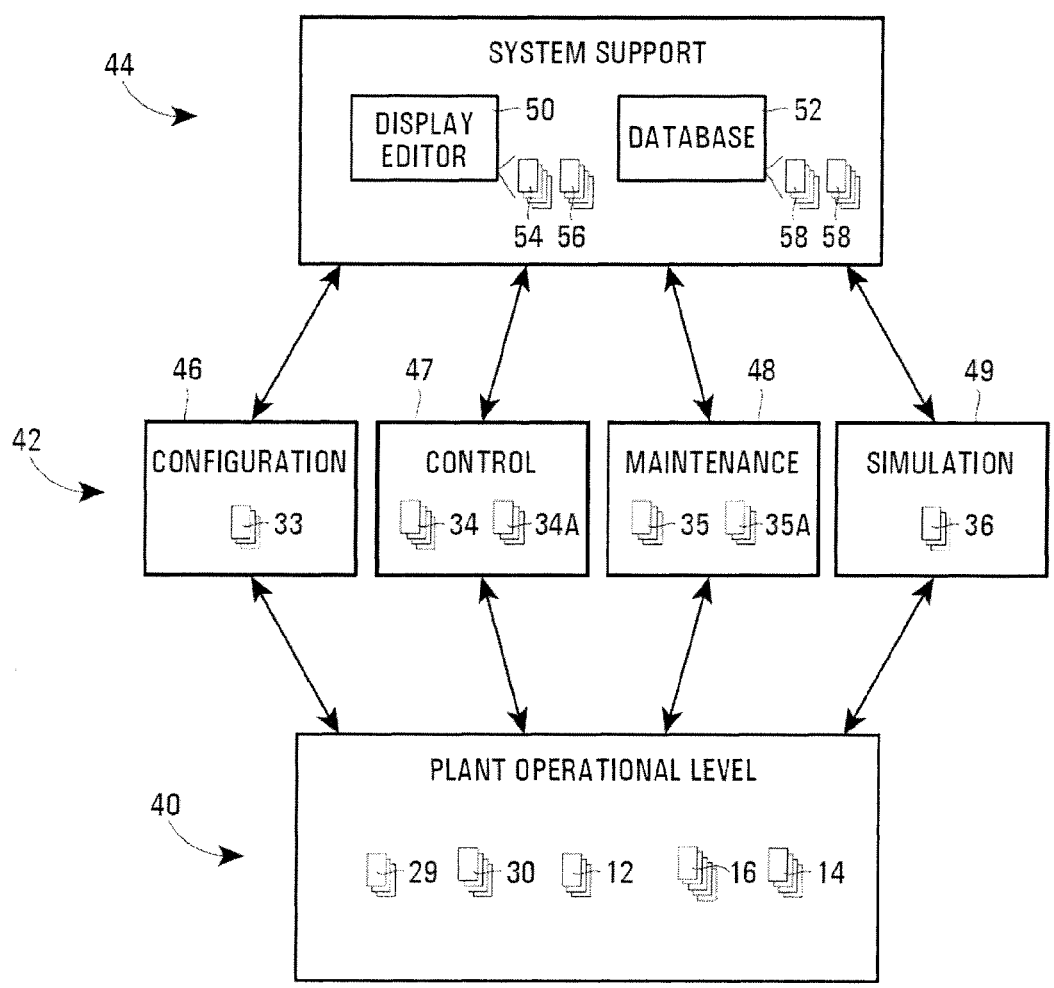
FIG. 2 is a logical block diagram illustrating the integration of system level graphical support within a process plant control, viewing and simulation system.

As illustrated in FIG. 2, the system level support layer 44 ties into and supports each of the function blocks 46-49 within the plant functional layer 42 to enable, for example, the creation and maintenance of common database and display structures, such as software objects, composite shapes and graphic displays for use in the various functional areas 46-49. More particularly, the system level support layer 44 includes application, database and graphical support elements that enable the graphical activities performed in each of the function blocks 46-49 to be integrated together, or to be developed using common database structures and composite shapes created at the system support layer 44.

The system support layer 44 may include a graphical editor 50 and a graphical object database 52. The graphical editor 50 may be used to create composite shapes 54 and graphic displays 56, while the graphic object database 52 stores the composite shapes 54 and displays 56 in a memory accessible by the editor 52 and by the various applications in the blocks 46-49. The database 52 may also store other objects 58 such as sub-elements for composite shapes 54, and data structures that connect the composite shapes 54 to individual hardware and software elements within the plant operational level 40. Additionally, the database 52 may store templates, sub-elements, and primitives that may be used to create further composite shapes, or displays. As will be understood from FIG. 2, the graphic display elements 54, displays 56 and other database structures 58 may be used by any and all of the functional blocks 46-49 to create and use graphics associated with those functional blocks.

Generally speaking, the system level support block 44 provides a manner of integrating the graphics used in the process plant 10 of FIG. 1 in all of the functional areas 46-49, to thereby reduce or eliminate the necessity of repeatedly creating different composite shapes for the same plant equipment in different functional contexts, and to make it easy for a user in each of the functional areas 46-49 to tie into data associated with the equipment being displayed in graphical views associated with those functional areas. As will be understood, the system level support layer 44 may be used to provide graphics and database support for multiple applications in each of the functional areas 46-49, for different applications in different ones of the functional areas 46-49, etc.

Referring again to FIG. 1, the system level support block 44 may be implemented using an additional workstation or user interface 60 which may be connected to each of the other workstations 20-23. The workstation 60 may generally store the graphics editor 50 and database 52 and may store the other elements 54, 56 and 58 if so desired. Additionally, the workstation 60 may be communicatively connected to the workstations 20-23 via the databus 24, via separate wired or wireless communication connections (illustrated by dotted lines in FIG. 1) or in any other desired manner. In the configuration illustrated in FIG. 1, the workstation 60 stores and executes the display editor 50 to enable a user to create composite shapes that include sub-elements and other composite shapes, and to group the shapes into one or more graphic displays or display modules. These display modules may be then stored in the database 52 to be accessed and used by various functional blocks 46-49 illustrated in FIG. 2 and implemented on the various workstations 20-23. While, for the sake of illustration, the functionality of the system level block 44 and the function level blocks 46-49 is illustrated as being implemented on different or separate workstations 20-23 and 60 in FIG. 1, it will be understood that any or all of the applications associated with any of these various blocks could be implemented on the same or different workstations or other computers within or associated with the process plant 10. Thus, the graphics editor 50 may be stored in and executed on any of the other workstations 20-23 or on any other computer associated with the plant 10 and need not be in a stand-alone or separate computer.

As discussed above, the system level layer 44 of FIG. 2 implements system level display and database objects, which can be used in a variety of the functional environments as well as to provide higher level display capabilities. Generally speaking, the display objects created at the system level 44 of FIG. 2 can be categorized as composite shapes and graphic displays. Composite shapes are generally display objects that are associated with a particular physical entity within the plant, such as a hardware device like a valve, a sensor, a pump, a controller, a tank, a reactor, a burner, a pipe, a pipe fitting, etc. Graphic displays are generally made up of a set of interconnected composite shapes and are used to represent and model more complicated sets of hardware within a plant, such as a unit, an area, etc. and include interconnections between different hardware units. Composite shapes may be made up of a plurality of sub-elements that may, themselves, be composite shapes. In other words, the composite shapes 74 may be nested. For example, a tank composite shape within a reactor graphic display may include one or more composite shapes of valves, pipe fittings, sensors, an agitator, etc., that are each made up of rectangles, ellipses, lines, etc. Likewise, the graphic displays may include one or more composite shapes, as well. Additionally, graphic displays may include graphs, charts and other data provided from the plant, from other applications, such as diagnostic and business applications running in the workstations 20-23 and 60, etc.

Figure 3:
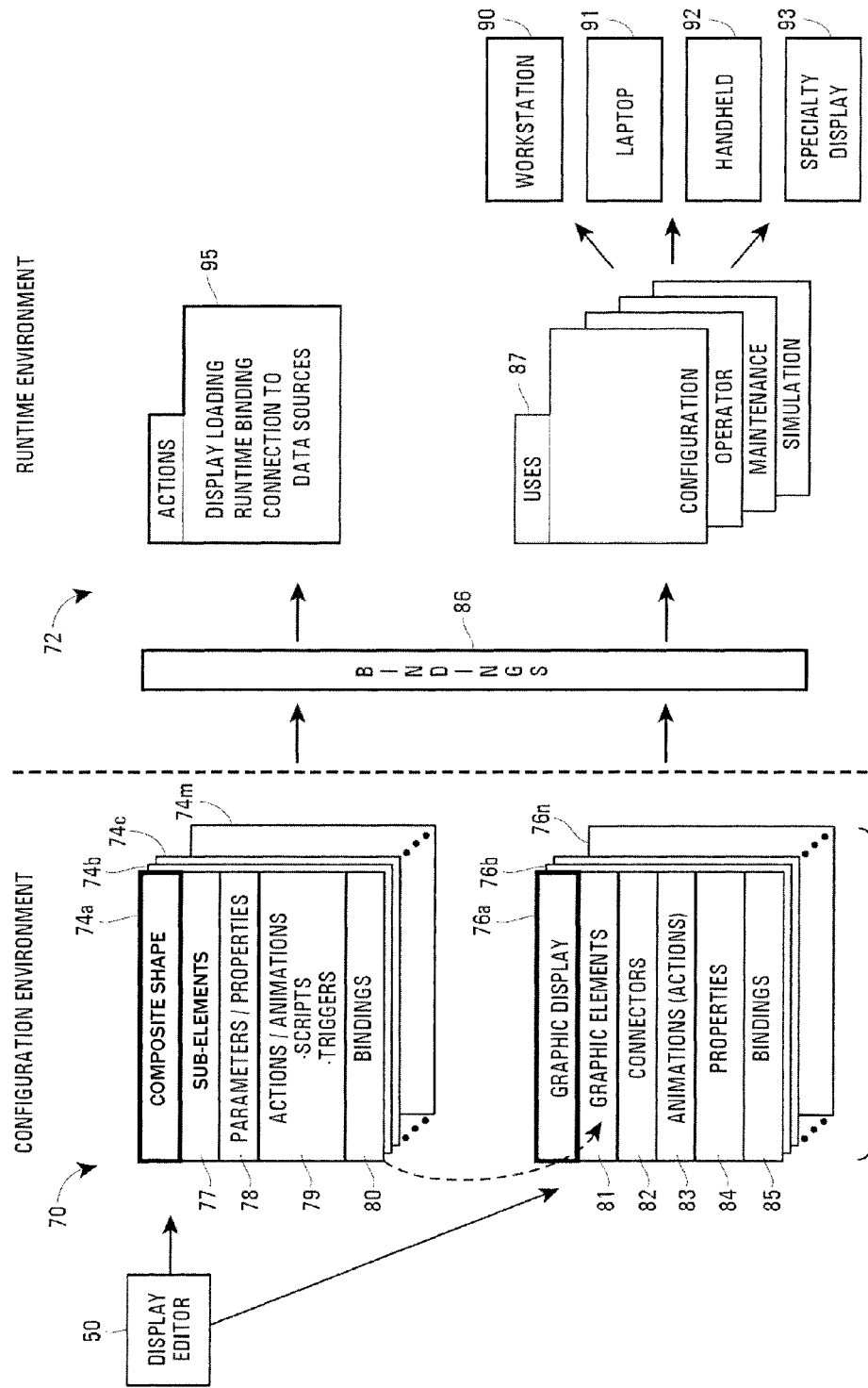
FIG. 3 is a logical diagram illustrating a configuration environment in which composite shapes and displays are created and a runtime environment in which composite shapes and displays may be executed.

FIG. 3 generally illustrates the development and use of composite shapes and graphic displays in two environments in which these elements and displays may exist, in particular, a configuration environment 70 and a runtime environment 72. Generally speaking, display objects in the form of composite shapes 74 (depicted as separate element objects 74a, 74b, etc.) and graphic displays 76 (depicted as separate display objects 76a, 76b, etc.) are created in the configuration environment 70 using, for example, the display editor 50. After being created, the objects 74 and 76 may be stored in the database 52. The objects 74 and 76 may be created as class objects, referred to herein as display class objects, that define a generic object not bound or tied to specific hardware or logical elements within the process plant 10. However, class objects can be used to create runtime graphical objects having the same basic properties as the class objects, but are tied or bound to specific hardware within the process plant 10. Generally speaking, however, class objects remain tied to the children objects instantiated therefrom, so that changes to the class objects can be automatically propagated to the children objects, even when these children objects are instantiated within a runtime environment.

As illustrated in FIG. 3, each of the composite shapes 74 includes a number of components that make the composite shape useful in many different contexts. In particular, each composite shape 74 includes one or more graphical elements or sub-elements 77, any number of parameters or properties 78, any number of actions or animations 79 which may be implemented using scripts or triggers, and bindings 80. Generally speaking, each element 77, 78, 79, 80 defines the visual properties or elements to be actually displayed on a display screen when the composite shape 74 is implemented in the runtime environment 72. Typically, composite shapes define a graphical representation of a physical or logical device or group of devices, although a composite shape could represent other entities. Composite shapes 74 may be implemented in the runtime environment 72 using any desired description or programming paradigm that defines the specifics of the graphical depiction of an entity. In one embodiment, the composite shapes 74 may be implemented using PGXML, XAML, or Windows Presentation Foundation (WPF—formerly named "Avalon") controls, which are well known controls provided by Microsoft® and which, because they are object based, are easily implemented in standard Windows® type displays and portable between display environments.

The sub-elements 77 of a composite shape 74 may include basic shapes that are the building blocks of the composite shapes 74. As previously described, the sub-elements may include rectangles, ellipses, curves, lines, and other basic shapes that, when manipulated and combined, form a graphical representation of a tank, valve, pipe fitting, or other object. A sub-element 77 may, itself, be a composite shape 74 to create a complex, nested structure. Therefore, the sub-elements 77 may also include one or more of the parameters/properties 78, actions/animations 79, and bindings 80, as further described below.

Generally speaking, the parameters and properties 78 define variables or other parameters such as static or changeable intrinsic parameters, associated with the shape or entity being depicted and these parameters are definable by the creator of the shape 74. In some embodiments, the parameters are related to how associated sub-elements of the composite shape 74 behave during scaling. For example, the parameters 78 may be defined so that when a composite shape is resized, the associated sub-elements inside the composite shape will scale instead of stretch or exhibit otherwise undesirable behavior. Some examples of scaling parameters are the font size for labels and other text portions of the composite shape, an edge width, a corner radius, a size scale, and a position scale, as further explained below. The parameters may apply to the shapes during resizing actions at both configuration time and runtime. The composite shape 74 may also implement an interface to allow the Scaling Canvas container, as discussed below, to access the parameters associated with resizing. Thus, with the parameters and interface, the composite shapes themselves may provide their own scaling logic.

Each sub-element 77 may include a limited number of scaling factors, In some embodiments, each sub-element 77 only includes those scaling parameters that, if changed, will change a corresponding characteristic of the shape. For example, an ellipse object may only include scaling parameters for x and y positioning, width, and height scaling, while a rectangle object may additionally include corner scaling parameters, and a text object may include parameters for font size scaling, etc. Of course, other parameters may control other scaling behaviors of composite shapes 74 such as spacing, depth (in three-dimensional shapes), sequencing, and other visual characteristics.

The actions and animations 79 define routines or programs (that may be implemented as scripts to perform transforms on parameters, detect conditions of a process entity based on parameter values, etc.), animation routines that may include any routines that change the composite shape or sub-elements of the composite shape or behaviors to be performed on or using the shapes when they are depicted on a display screen, or routines which enable a user to use or interact with the shape 74 to cause a change in the process, such as a change to an input to the process. These actions and animations provide the composite shapes 74 with more interesting, understandable or helpful graphical properties and to allow the user to interact with the composite shapes 74. In one case, these actions or animations may take the form of changes in color, size (e.g., height and width, line size, fonts, etc.) of various components and sub-elements 77 of the shape, color fills, and animations such as changes in color, rotations, resizing, rescaling, skewing, etc. These actions and animations provide graphical properties as well as user interaction properties to the composite shape 74.

The bindings 80, which may be static or fixed bindings or bindings which use aliases, define the manner in which the parameters or properties 78 are to be bound to data, tags or other entities within the runtime environment 72 when the composite shape 74 is implemented as part of a display in the runtime environment 72. To prevent distortion of the composite shape 74 during resizing at both configuration and runtime, the bindings 80 for each composite shape may include one or more bindings to a Scaling Canvas, as further discussed, below. Generally, the bindings 80 for each composite shape 74 establish the manner in which the composite shape 74 is tied to one or more entities or data elements defined elsewhere in the plant environment, and thus define an interface between the actual runtime environment 72 and the composite shape 74.

As illustrated in FIG. 3, each of the graphic display objects 76 includes numerous components, such as a reference to or a copy of one or more composite shapes 81, connector elements 82, actions and animations 83, properties 84 and bindings 85. Generally speaking, a graphic display 76 may be a display that depicts the interaction of various composite shapes 81 that may be visually connected together with connector elements 82 representing pipes, lines, conveyor belts, etc. Such connector objects are described in U.S. Pat. No. 7,110,835. A dotted line in FIG. 3 illustrates a reference to one of the composite shapes 74 by the graphic display object 76a. It will be understood that the graphic display 76 that references a composite shape 74 includes all of the properties, parameters, actions and animations, etc. of that composite shape 74. Similar to the composite shapes 74, each graphic display 76 may include one or more additional actions or animations associated therewith that perform, for example, animations on the display, user interface interactions, data manipulations, etc. Likewise, each graphic display 76 may include any number of properties associated with the display, and typically these properties define properties of units, areas, or other groups of elements depicted within the display. Of course, the bindings 85 define the manner in which the graphic display 76 is tied to one or more entities or data elements defined elsewhere in the plant environment and thus define an interface between the actual runtime environment 72 and the graphic display 76.

Once created, the composite shapes 74 and the graphic displays 76 may be bound to and executed in the runtime environment 72 on, for example, any of the workstations 20-23 of FIG. 1. In particular, after a composite shape 74 or a graphic display 76 is created as a class object and is stored in the database 52, that element or display may be instantiated as an actual runtime object and may be executed in the runtime environment 72. As illustrated by the block 86, the instantiation process fills in the bindings defined in the objects 74 and 76, which may be accomplished using one or more resolution tables that may be loaded with proper variable names, tags, aliases etc. within the process plant or process control system to provide a specific connection between actual entities within the process plant and the graphic objects running on a display device within the plant 10. As part of the binding process, the objects 74 and 76 connect to data sources within the process plant as defined by the resolution table, and thereby gain access to the plant so as to be logically and communicatively connected to the process plant 10.

As illustrated by the blocks 87, a composite shape 74 or a graphic display 76 can be executed in or as part of a number of different functions within the runtime environment 72, including a configuration display, a control operator display, a maintenance display and a simulation display, to name but a few. For example, any of the displays may be used to resize or scale the composite shape 74 without distortion. Additionally, the display objects 74 and 76 may be used to perform system level functions, e.g., ones that use data from various ones of the functional levels depicted in FIG. 2, including for example, predictive control or predictive maintenance functions, system level error detection, diagnostics, etc. In fact, the displays 76, once created in the configuration environment 70 and stored in the database 52 may be used for a number of different activities in the runtime environment 72. Still further, the display objects 74 and 76 may be executed on any desired display or computer hardware, such as a workstation 90, a laptop computer 91, a handheld device 92, like a personal data assistant (PDA), a telephone device, etc., or any other specialty display 93, such as a large screen display having multiple monitors, etc. If desired, a single graphic display 76 may be layered to include one or more views, such as configuration view, an operator view, a maintenance view and a simulation view. Alternatively, separate graphic displays 76 may be configured to provide these separate views using the same or similar composite shapes 81, to provide a consistent look and feel across displays created for these various functions.

As illustrated by the block 95, a composite shape 74, or a graphic display 76 may be copied or instantiated, and loaded onto the runtime machine to be ported to the runtime environment 72. Generally speaking, it is desirable that the display object 74 or 76 be bound to the runtime environment 72 only when called up or actually executed on a runtime machine, which is referred to herein as runtime binding. That is, the resolution table for each of the instantiated objects is only filled in or bound to the runtime environment when the display object is actually running or being executed in a runtime computer. Thus, the display object is preferably only bound to the runtime environment 72 when that object is actually running on a runtime computer, which means that the display objects 74 and 76 may be intermittently connected to the runtime environment 72 in a manner defined by the activities of the users viewing the display created by these objects. In particular, these objects may be bound to a runtime environment 72 at the times at which they are required to be viewed, and may be unbound or released when not being viewed by a user, such as when a user minimizes or closes a screen in which these objects are providing a display.

The display objects 74 and 76 are thus objects which may be created in a stand-alone environment, i.e., the configuration environment 70, but which may be tied or connected with other objects or data structures defined within the process plant environment or any application running within the process plant environment, including, for example, objects, data structures, applications, etc. defined in any control, simulation, maintenance, or configuration environment. Furthermore, once created, the display objects 74 and 76 may be bound to physical or logical process entities directly, via direct references, variables or tags defined in a resolution table, or indirectly through the use of alias names, variables and parameters, which may be resolved either when the display object 74 or 76 is downloaded or instantiated within the a runtime environment 72, or in some cases, when the display object 74 or 76 is actually running within the runtime environment 72.

The display editor 50 of FIG. 3 may enable the composite shapes 74 and graphic displays 76 to be created at various levels of detail at configuration time, to enhance their ease of use and their versatility. For example, composite shapes 74 may be created first to define the properties and operations of more primitive physical and logical entities. Graphic displays 76 may be created by interconnecting one or more composite shapes 74 to create higher level or more complicated displays depicting more complicated physical or logical entities, or groups of physical or logical entities. Of course, both composite shapes 74 and graphical displays 76 may be stored and accessed in various different categories to make the creation of higher level display objects easier for the user.

Figure 4A:
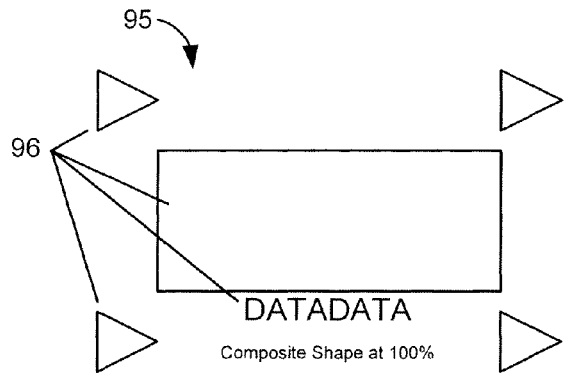
FIG. 4a is one illustration of an unscaled composite shape.
Figure 4B:
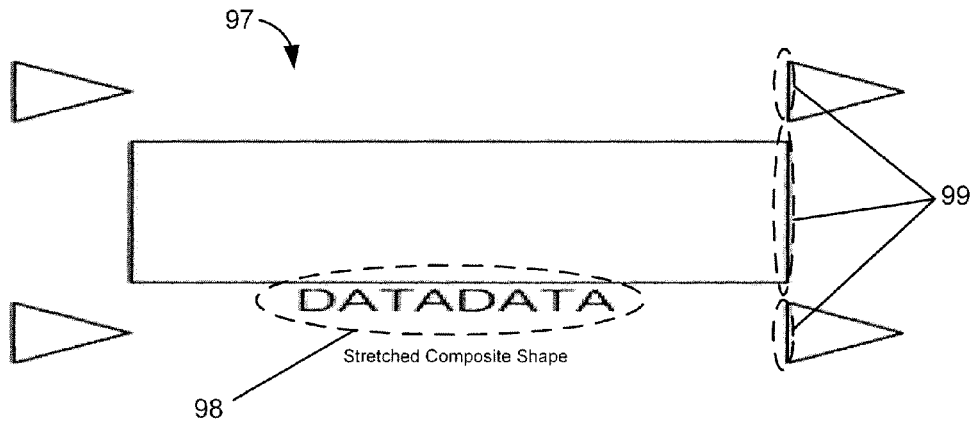
FIG. 4b is one illustration of a composite shape after resizing without applying scaling parameters.
Figure 4C:
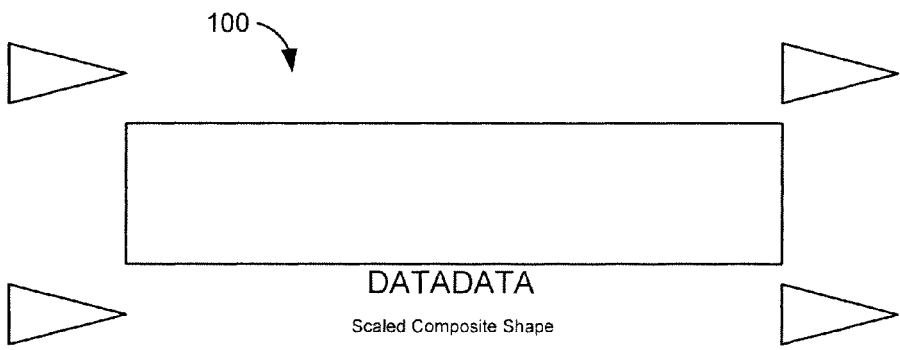
FIG. 4c is one illustration of a composite shape after resizing using one or more scaling parameters.

FIGS. 4a and 4b illustrate one example of resizing composite shapes using a typical display editor 50 at configuration time, or when resizing one or more of the displays 87 at runtime and FIG. 4c illustrates one example of resizing a composite shape while employing scaling parameters, baseline or unscaled parameters, and scaling factors during a resizing action, as explained in detail below. As shown in FIG. 4a, a composite shape 95 may be created at configuration time and displayed at configuration time and runtime to include one or more sub-elements 96 including basic shapes (triangles, rectangles, ellipses, etc.) and text elements. As described in relation to FIG. 2 and FIG. 3, the sub-elements 96 may include one or more parameters 78 that determine the behavior of the sub-element within the display editor 50 at configuration time and the display (e.g., a workstation, laptop, handheld, specialty display, etc.) at runtime. Some parameters 78 may determine the behavior of the sub-elements 96 during a resizing action at one or more of configuration time and runtime. For example, a configuration time or runtime user may resize an instance of a composite shape such as a feed tank, pump, reactor, etc., to indicate different capabilities or capacities, or to emphasize the importance of a particular composite shape within a display. FIG. 4b illustrates a result of a resizing action of a composite shape 97 that that does not include sub-element resizing parameters or does not consider sub-element resizing parameters during a resizing action. As shown in FIG. 4b, a resizing action on a composite shape within a typical editor may apply the degree to which a composite shape is resized equally to the entire composite shape, resulting in undesirable distortions. Particularly, if the resizing is applied indiscriminately to all sub-element parameters of the entire composite shape 97 (e.g., a text font size, a rectangle height and width, etc.) without accounting for sub-element resizing parameters or if the composite shape 97 does not include resizing parameters, text may distort and appear stretched or narrow 98, edges may appear thicker or thinner 99, some corners may appear to lose contour, or other distortions may appear in a resized composite shape 97. However, if, scaling parameters are defined for each sub-element 96 during configuration time and a resizing action at configuration time or runtime accounts for the scaling parameters during resizing of the composite shape 95, as shown in FIG. 4c, the distortions shown in FIG. 4b may be avoided in a resized, scaled composite shape 100.

Figure 5A:
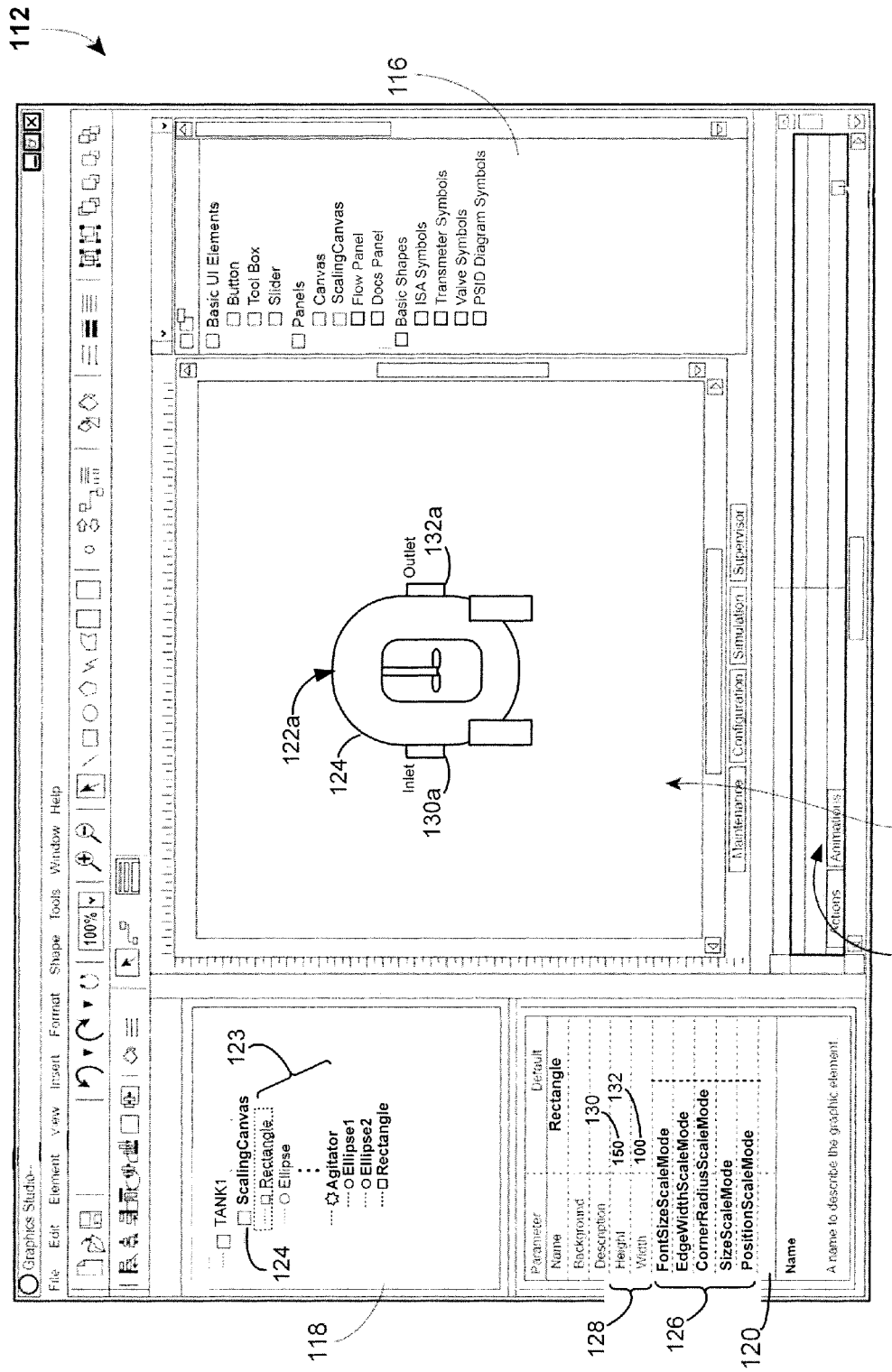
FIG. 5a is a display screen produced by a graphical editor showing a composite shape at configuration time.
Figure 5B:
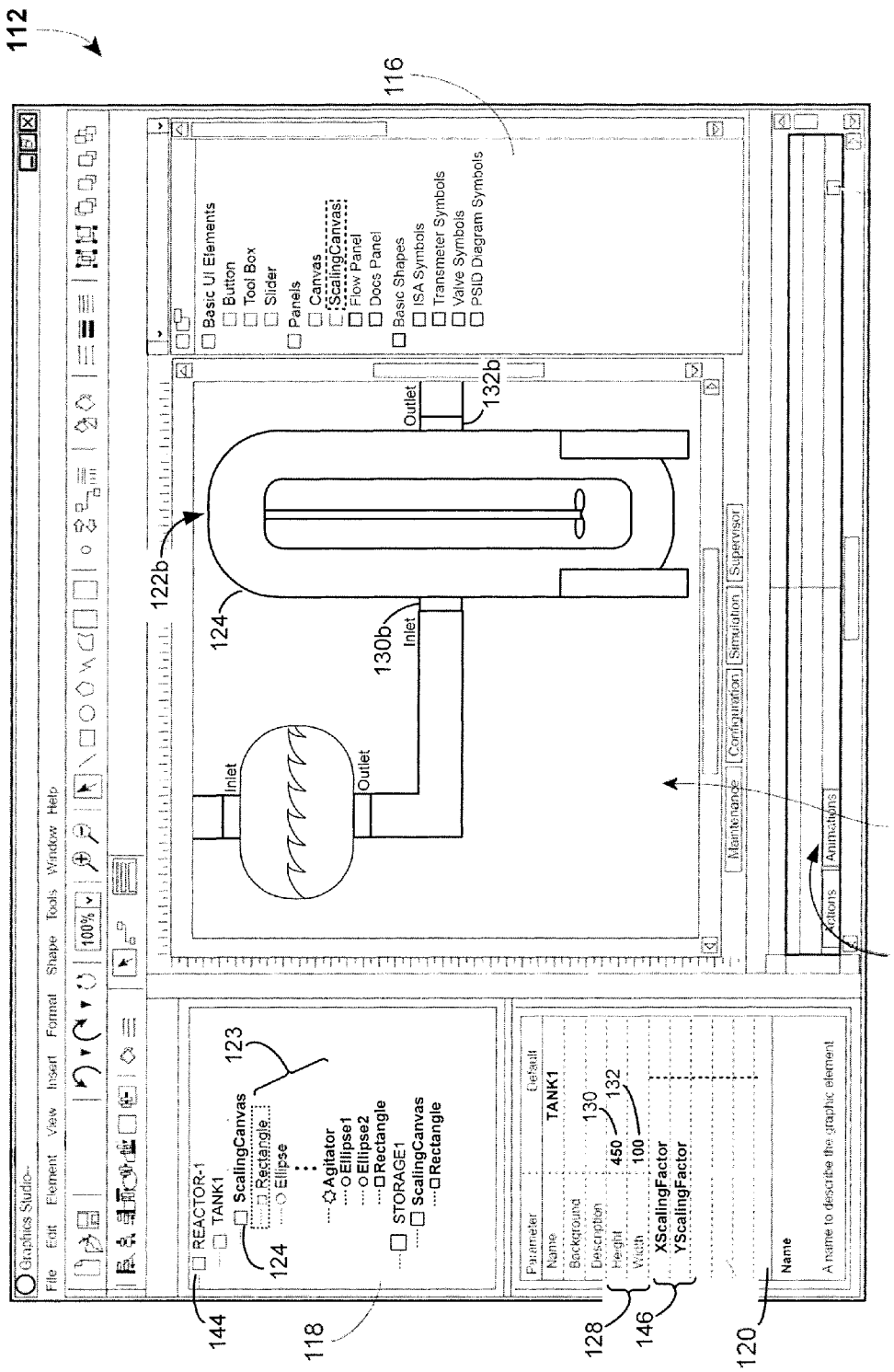
FIG. 5b is a display screen produced by a graphical editor showing a configured composite shape that has been resized in a first dimension using the logic of a Scaling Canvas container, baseline or unscaled parameters, and composite shape parameters.
Figure 5C:
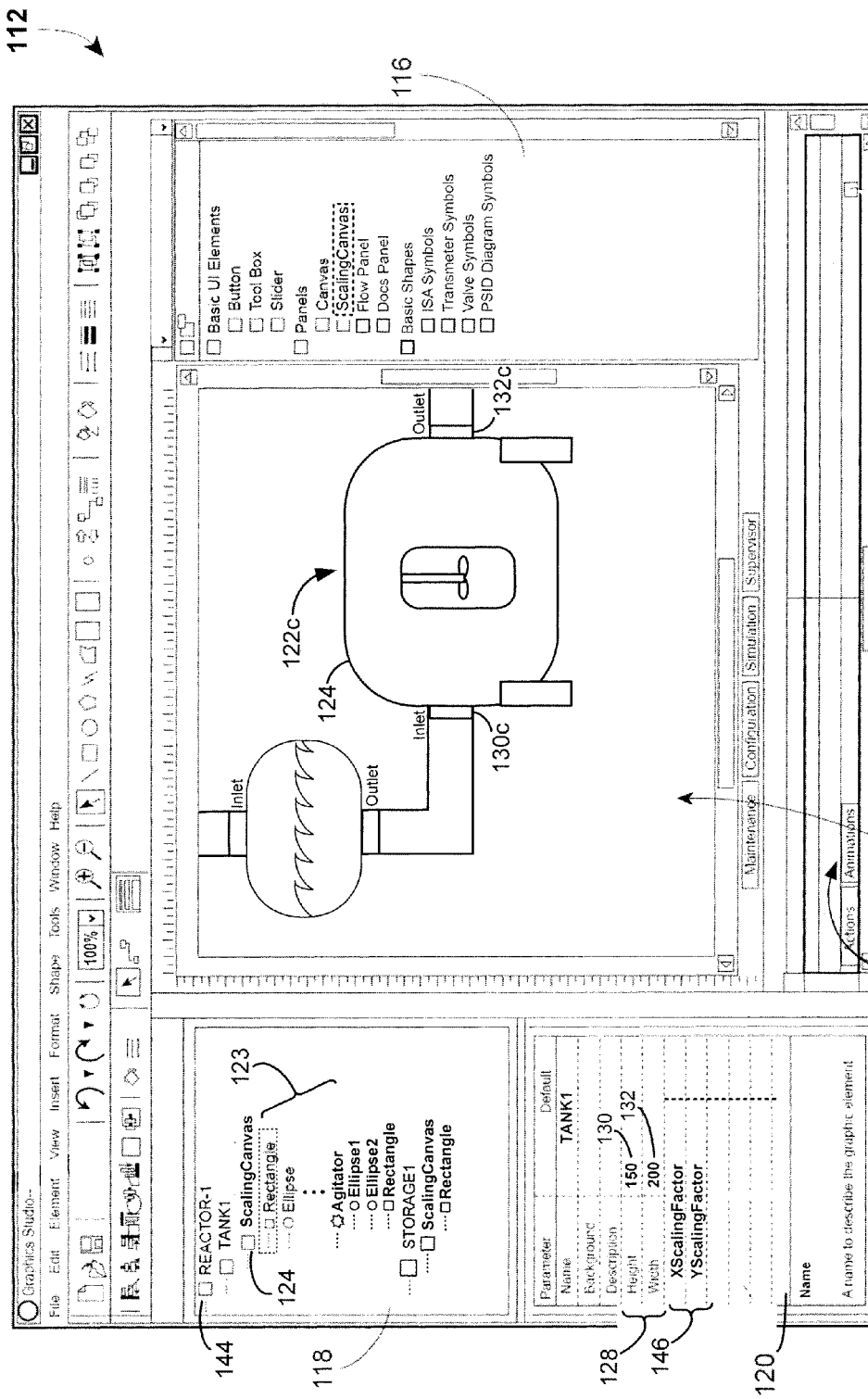
FIG. 5c is a display screen produced by a graphical editor showing a configured composite shape that has been resized in a second dimension using the logic of a Scaling Canvas container, baseline or unscaled parameters, and composite shape parameters.

FIG. 5a illustrates an example screen display of a graphic editor 112 that may be created by the display editor 50 and used to apply or modify one or more scaling parameters to control the behavior of a composite shape during a resizing action at configuration time. The editor 112, which is depicted in the process of creating a tank composite shape that may eventually be used in a graphic display depicting, for example, a reactor portion of a process plant (FIGS. 5b and 5c), includes a main edit section 114, a pallet view 116, an element hierarchy section 118, and a parameter definition section 120. The main edit section 114 provides a working space for the user or designer to define or create a composite shape and thus to define the visual properties of the composite shape, in this case a tank, and also to arrange and configure the composite shapes into graphical displays, such as a reactor (FIGS. 5b and 5c). Generally speaking, the composite shape 122a created by the element editor 50 may be made up of one or more sub-elements 123 or various shapes that are placed or grouped together in a defined manner. The sub-elements may also be composite shapes such that a single composite shape may include one or more "nested" composite shapes as sub-elements. For example, composite shapes may include circles, lines, points, polygons, squares, rectangles, triangles, or other graphic shapes as sub-elements. The tank composite shape 122a of the reactor graphic display depicted in FIG. 5a is one example of a composite shape as it includes multiple sub-elements 123. As described above, one or more of the sub-elements may be a composite shape, for example, an "Agitator" sub-element of a "Tank" composite shape may be made up of several sub-elements that each include one or more scaling parameters, but may include a single set of scaling parameters for the nested composite shape. When defined in this manner, separate actions or animations may also be applied to or associated with each of the different shapes making up a composite shape 122a. Of course, composite shapes may include more elaborate artistic renditions of elements. To define or build up a composite shape, a user or designer may add any number of sub-elements or other composite shapes to the main edit section 114 and group these together in any desired manner.

The composite shapes may include a number of parameters that may be defined during configuration time (i.e., creation of the composite shape) that are depicted in FIG. 5a. In some embodiments, the parameters may be related to scaling behaviors of the composite shapes. For example, scaling parameters may define or control what, if any, effect a resizing action may have on the sub-elements of the composite shapes, as further explained herein. Once created, composite shapes define the graphical representation for an actual object, which might be implemented in the runtime as an XAML or WPF object, that will be displayed on a screen or display when the composite shape is used in a runtime environment. The shapes or sub-elements 123 making up the composite shape may be illustrated in a composite shape hierarchy in the hierarchy section 118. In the configuration time environment illustrated in FIG. 5a, a user may associate and define various scaling parameters, as described below, with each sub-element of the composite shape.

In the editor 112, the pallet view 116 includes a number of basic elements that can be used to create a composite shape 122a. For example, the pallet view 116 includes a set of basic UI (user interface) elements, such as buttons, text boxes, sliders, knobs, etc., a set of basic panels, and a set of basic shapes. The defined panels may provide a container for various sub-elements and may impart one or more configuration or runtime behaviors to the contained sub-elements. For example, the various panels may include a scaling canvas panel 124 that includes the functions of the canvas panel with the additional function of being able to resize a composite shape 122a without distortion of it sub-elements. In some embodiments, the Scaling Canvas 124 is a container object for one or more sub-elements that, collectively, comprise a composite shape 122a. In other embodiments, the Scaling Canvas 124 is visually represented in the editor 112 as an area or panel, such as the main edit section 114, or a background of the composite shape 122a upon which one or more sub-elements 123 or the composite shape 122a may be placed for re-configuration, editing, or resizing. The Scaling Canvas 124 may also be an extension of the Windows Presentation Foundation (WPF) Canvas class. A composite shape 122a may be selected from the pallet view 116 and dragged to the edit section 114. Still further, the sub-elements and composite shapes in the pallet view 116 may include ISA (Instrument Society of America) symbols, transmitter symbols, valve symbols, PI&D diagram symbols or other control symbols, etc. or any other desired shapes, all of which can be used to build a composite shape.

The element hierarchy section 118 provides, using a hierarchical view or a tree structure, the components associated with the shape 122a within the main edit section 114. In the example of FIG. 5a, the hierarchy section 118 shows that the composite shape 122a being defined in the main edit section 114 includes sub-elements or primitives 123 of a Rectangle and an Ellipse and well as a sub-element that is a composite shape of an Agitator, and its ellipse and rectangle sub-elements Of course, the sub-elements depicted in the hierarchy section 118 are for illustration purposes only as the shape 122a illustrated in FIG. 5a includes more sub-elements than shown. The hierarchy section 118 also provides an indication of the type of container for the composite shape 122a, for example, a Scaling Canvas 124, that includes the scaling and resizing capabilities as discussed herein. While not shown in FIG. 5a, the hierarchy section 118 may include indications of animations, actions and other display features, such as scripts, visual triggers, etc. defined for the shape 122a.

The parameter definition section 120, illustrates all of the parameters, including intrinsic parameters, currently defined for the composite shape 122a shown in the editor 112. Each sub-element 123 of the composite shape 122a or the Scaling Canvas 124 may include various scaling parameters 126 that prevent distortion of the sub-element 123 during resizing of the composite shape 122a, as described herein. During configuration, if the Rectangle sub-element of FIG. 5a is selected in a composite shape 122a that includes the Scaling Canvas 124 container, the parameter definition section 120 may illustrate one or more scaling parameters 126 of the selected sub-element including a font size, edge width, corner radius, size (width and height), and position (x and y coordinates). In one embodiment, the scaling parameters include a naming convention to differentiate them from regular, non-scaling parameters, For example, the scaling parameter names may include FontSizeScaleMode, EdgeWidthScaleMode, CornerRadiusScaleMode, SizeScaleMode, PositionScaleMode. The definition section may include one or more baseline or unscaled parameters 128 such as a Height and Width. The scaling parameters 126 may control how the sub-elements contained within the Scaling Canvas 124 container of the composite shape 122a are scaled when the shape is re-sized. Different sub-elements may have different scaling parameters. For example, an Ellipse sub-element may include Size (height and width), and Position (x and y coordinates) scaling while a Text sub-element may include Font Size scaling.

Figure 6A:
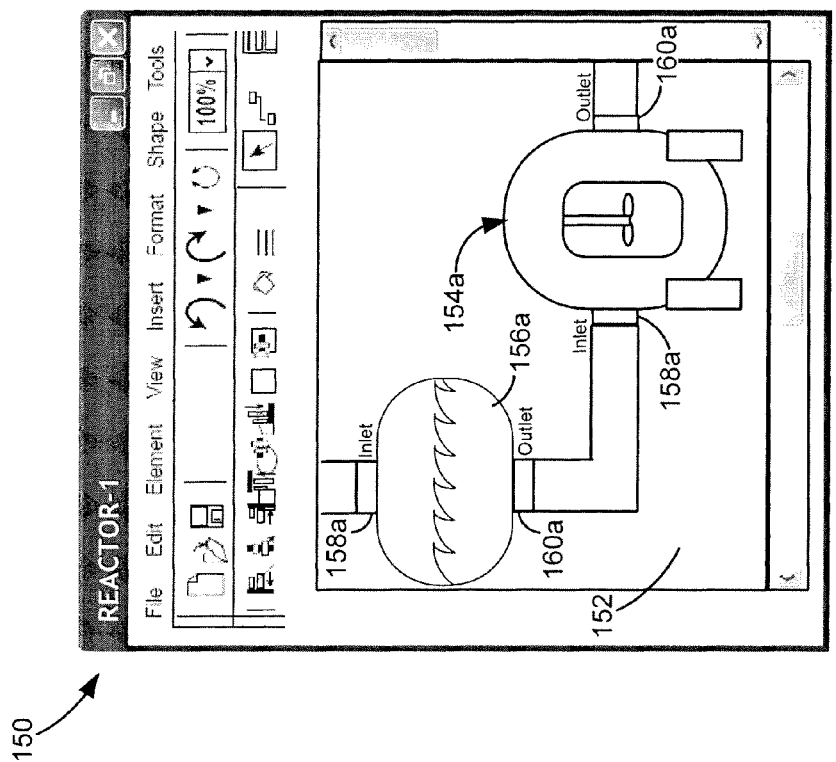
FIG. 6a is a display screen showing a graphic display at runtime.
Figure 6B:
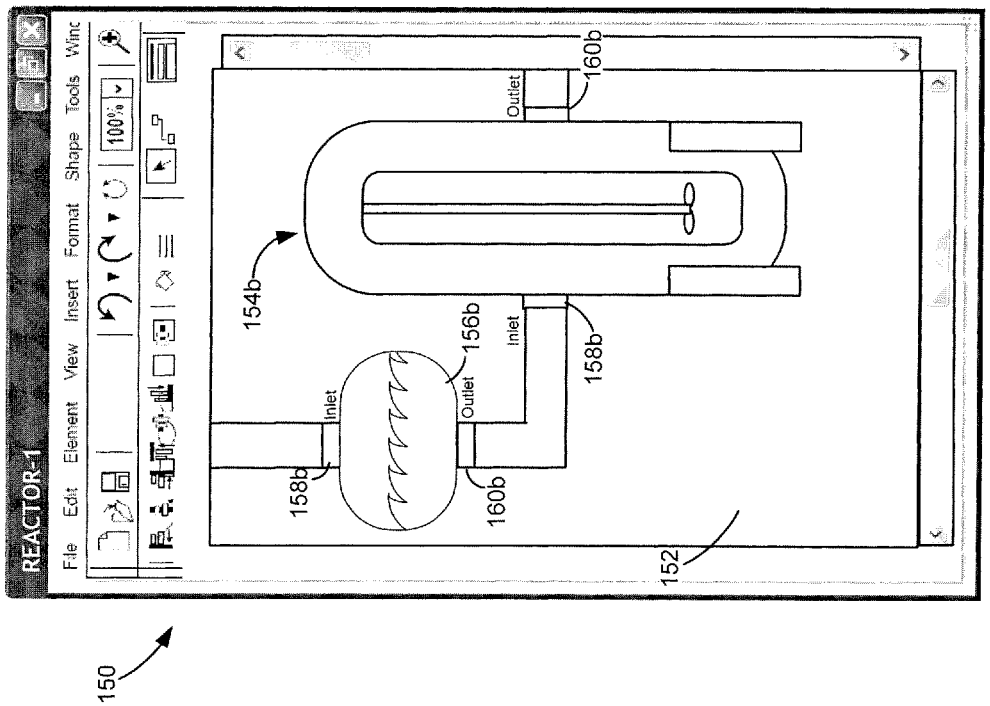
FIG. 6b is a display screen showing a graphic display that has been resized at runtime in a first dimension using the logic of a Scaling Canvas container, baseline or unscaled parameters, and composite shape parameters.
Figure 6C:
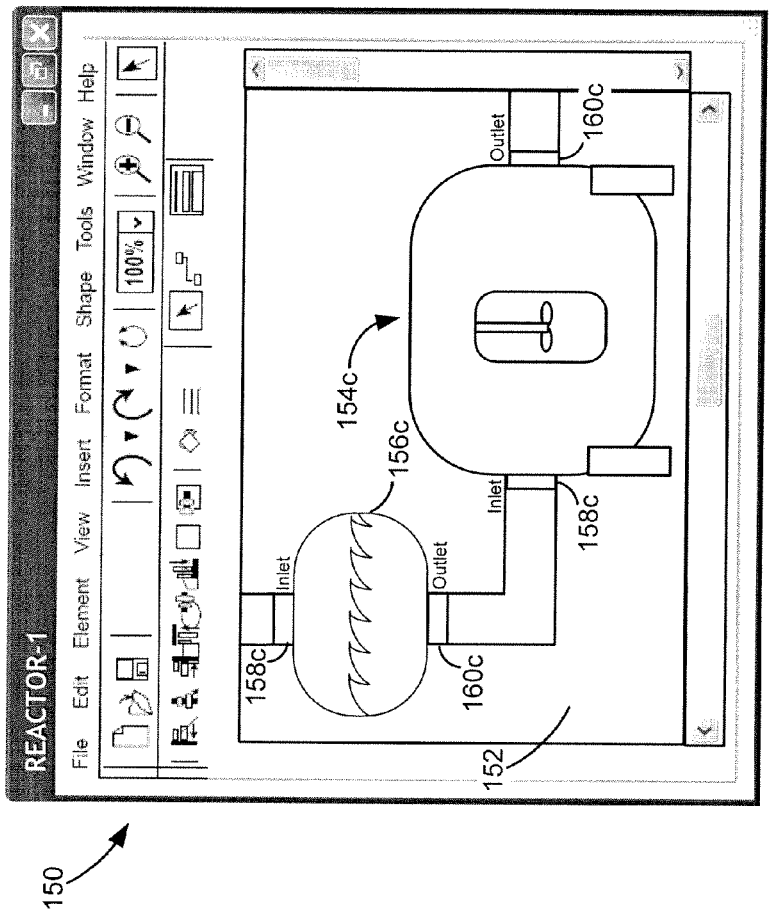
FIG. 6c is a display screen showing a graphic display that has been resized at runtime in a second dimension using the logic of a Scaling Canvas container, baseline or unscaled parameters, and composite shape parameters.
Figure 7:
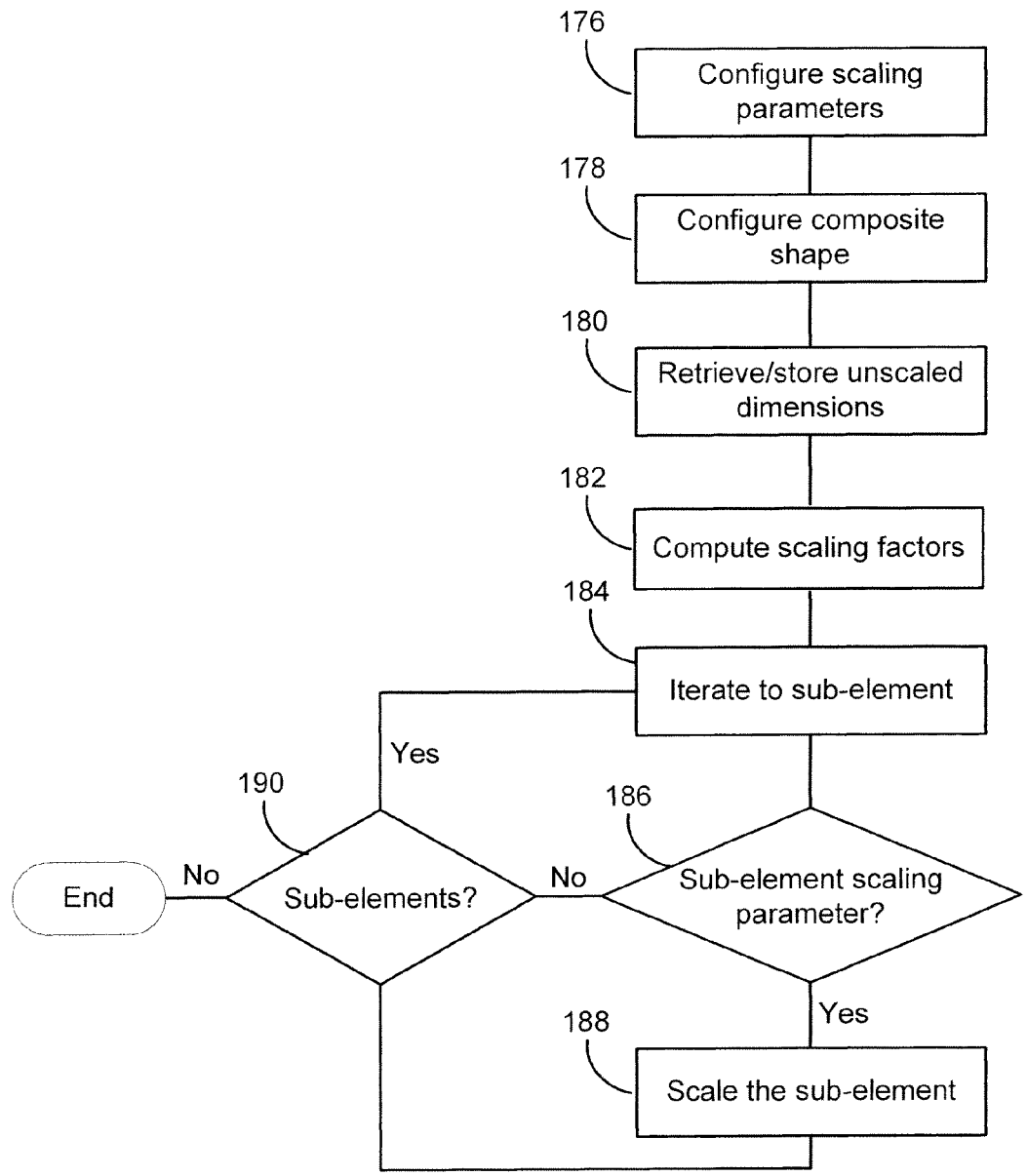
FIG. 7 is a block diagram illustrating one manner in which composite shapes may be resized at configuration time and runtime without distortion.

The Scaling Canvas 124 container or panel may interface with and manipulate the scaling parameters 126 and baseline or unscaled parameters 128 that are configured from the definition section 120. The configured scaling parameters 126, baseline/unscaled parameters 128, and logic of the scaling canvas container 124 may permit undistorted resizing of the composite shape 122a in both a configuration environment (as illustrated in FIGS. 5a, 5b, and 5c) and a runtime environment (as illustrated in FIGS. 6a, 6b, and 6c). For example, at configuration time when a user is creating the various composite shapes 122a to be stored in a composite shape library, or creating a graphic display including one or more composite shapes, the user may configure the one or more scaling parameters 126 so that a resizing action will change the dimensions of a shape without distortion to produce an accurate representation of a process control plant. Also, when user opens and uses a operator display at runtime, the user or operator may customize or adjust the display by moving a slider bar or resizing a window including the display, thus resizing its composite shapes.

In one embodiment, the logic of the scaling canvas container 124 determines a scaling factor from the baseline/unscaled parameters 128 and scaling parameters 126 and applies the factor to each sub-element of a composite shape that includes a scaling parameter 126 corresponding to a changed characteristic or dimension during a resizing action. For example, if the composite shape 122a is resized in a horizontal, length, or X dimension, then the logic may determine a horizontal, length, or X-dimension scaling factor, and if the composite shape 122a is resized in a vertical, height, or Y dimension, then the logic may determine a vertical, height, or Y-dimension scaling factor. In another embodiment, the Scaling Canvas includes logic to implement the scaling parameters as attached properties at configuration time and runtime, as further described herein. Regardless of whether the resizing action occurs at configuration time or runtime, the Scaling Canvas may adjust the sub-elements' size directly during a resizing action to prevent any distortion or unwanted resizing of fonts, borders, and other characteristics.

Resizing a composite shape 122a may, essentially, replace a value of the unscaled or baseline parameters 128 with a scaled parameter to reflect the shape's changed size. The Scaling Canvas may then refer to the stored baseline values 128 to determine how much the resizing action changed the baseline parameter 128. Further. when the shape 122a or sub-element 123 within a Scaling Canvas container 124 is selected from the pallet view 116, placed on an operator display and resized, the new "unscaled" parameters (e.g., size, position, height, width, etc.) may be stored as a starting point for any future resizing action as applied to the entire composite shape 122a.

Once the baseline parameters 128 are stored and the scaling parameters 126 are set at configuration time as illustrated in FIG. 5a, the configured composite shape may be stored in a composite shape library for use at configuration time when configuring the composite shapes 122 and graphical displays 144 (FIGS. 5b and 5c), and at runtime within a graphic display 150, as depicted in FIGS. 6a, 6b, and 6c. For example, FIG. 5b illustrates configuration of a "Reactor-1" graphic display 144 that includes the composite shape "Tank1" as configured within the editor depicted by FIG. 5a, and another composite shape of "Storage1." As previously described, the Scaling Canvas container 124 includes logic to compute the scaling factor 146 that, once a resizing action occurs, may be applied to each sub-element 123 that includes a scaling parameter 126. The scaling factor 146 may be a ratio of one or more resized dimensions of a resized composite shape 122b (FIG. 5b) to one or more corresponding baseline or unscaled parameters 128 of the sub-elements. For example, where the composite shape 122a contained within the Scaling Canvas is resized to a height of two hundred, and the original, baseline height of the sub-element within the Scaling Canvas-contained composite shape 122a is one hundred, the resulting scaling factor is (two hundred÷one hundred) two. Therefore, if the sub-element does not include a scaling parameter, or if the sub-element includes a scaling parameter that allows the sub-element to be resized, the baseline/unscaled value of that sub-element is changed by a factor of two. However, if the sub-element includes a scaling parameter that does not allow the sub-element to be resized, the baseline/unscaled value of that sub-element will not change. The resizing action may iterate through the children of the composite shape 122b (i.e., the remaining sub-elements) to apply the scaling factor(s) 146 to each sub-element 123 to create an undistorted, resized rendering of the original composite shape.

The scaling parameters 126 that may be configured at configuration time control how the scaling factors 146 are applied to the configured sub-elements during the resizing action described above. For example:

A Font Size Scale Mode parameter may control whether or not the font size scales with the shape. The Font Size Scale Mode parameter may be applied to text-based shapes (e.g., a Text object sub-element or the DataStamper in the DeltaV™ environment) to prevent unwanted stretching or other distortions during resizing of the composite shape 122a. The value of the Font Size Scale Mode parameter may be one of "scale" or "none." The font size of the Text object sub-element may scale on the smaller x or y scale factor to prevent distortion.

An Edge Width Scale Mode parameter may control if the edge of a shape 74 scales with other portions of the shape 74 during resizing. The value of the Edge Width Scale Mode parameter may be one of "scale" or "none." The Edge Width Scale Mode parameter may control if the edge width scales with the smaller of x or y scale.

A Corner Radius Scale Mode parameter may control if the radius of a composite shape corner changes with the rest of the shape 74 or remains unchanged during resizing. The Corner Radius Scale Mode parameter may be applied to sub-elements that include a corner radius such as a Rectangle, a Polyline, and a Polygon. The value of the Corner Radius Scale Mode parameter may be none, x, y, and x and y. For example, a value of "none" may indicate that the corner radius of the sub-element may not scale based on the x and y scaling factors. The value of "x" may indicate that the corner radius of the sub-element may adjust the "x" dimension of the corner radius proportionately to the "x" scaling factor, while a value of "y" may indicate that the corner radius of the sub-element may adjust the "y" dimension of the corner radius proportionately to the "y" scaling factor. The value of "x and y" may indicate that the corner radius of the sub-element may adjust both the x and y dimensions of the corner radius proportionately to the x and y scaling factors.

A Size Scale Mode parameter may control if the width and height of the sub-element will scale proportionately to the rest of the composite shape 122a during resizing. For example, this parameter may control if the defined width and height of the sub-element will scale proportionately to the Scaling Canvas container X and Y scaling factors. The parameter may include a value of None, Width, Height, and Width and Height. A value of "None" may indicate that the defined width and height will not scale based on the x and y scale factor. "Width" may specify that the sub-element automatically adjusts the width proportionately to the x scale factor, while "Height" may specify that the sub-element automatically adjusts the height proportionately to the y scale factor. "Width and Height" may indicate that the sub-element automatically adjusts the width and height proportionately to both the x and y scale factors.

A Position Scale Mode parameter may control if the position of the sub-element is locked or if the sub-element will move relative to other sub-elements during resizing of the composite shape 122a. For example, the x and y coordinate position of the sub-element may scale proportionately to the Scaling Canvas container or may be locked in their respective positions. The parameter may include values of None, X, Y, and X and Y. A value of None may indicate that the x and y positions of the sub-element will not scale based on the x and y scaling factors. A value of X or Y may specify that the sub-element automatically adjusts the x or y position proportionately to the x or y scale factor, respectively. A value of X and Y may specify that the sub-element automatically adjusts the x and y position proportionately to both the x and y scale factors.

The user or designer could add other parameters to the composite shape and the composite shape sub-elements by defining the names, types and bindings of other variables, parameters, etc. within the parameter definition section 120 to thereby define other aspects of the composite shape 122a. The scaling parameters 126 may include any of the selections described above as well as numerical values for other settings. Thus, for example, the parameters could also be arrays, tables, enumerated lists or any other types of variables or data structures.

After a resizing action, as illustrated in FIG. 5b, some portions of the tank composite shape 122b are increased in height by the scaling factor, while others are not. For example, the size of an inlet sub-element 130a and an outlet sub element 132a of the tank composite shape 122a (FIG. 5a) remains unchanged at FIG. 5b. Also, while an overall position of the inlet and outlet sub-elements changes from shape 122a to shape 122b, the relative position of these sub-elements as being in the middle of the tank shape does not change. In this embodiment, both the inlet and outlet sub-elements include at least a Size and a Position scaling parameter that determines the sub-element's behavior upon resizing. For example, the Size scaling parameter may be set to "None" while the Position scaling parameter may be set to "X and Y" or "Y." Thus, in the above example, the scaling factor of two for the change in height (i.e., the Y dimension) would be applied the position, but not the size of the inlet and outlet sub-elements. The various other sub-elements of the tank composite shape 122a may include scaling parameters 126, as described above, and the Scaling Canvas 124 may wholly or partially apply the scaling factor to these sub-elements, as well.

Of course, the tank composite shape 122a may be resized at configuration time within a graphic display 144 in a variety of dimensions (e.g., the width, length, or X dimension, as illustrated in FIG. 5c). As previously described, the Scaling Canvas 124 may compare the unscaled width of the resized tank composite shape 122c to the definition width to calculate a scaling factor. The Scaling Canvas 124 may then iterate through the composite shape sub-elements and apply the width scaling factor to those sub-elements that include a width scaling parameter. For example, the Size scaling parameter may be set to "None" while the Position scaling parameter may be set to "X and Y" or "X" for the inlet and outlet sub-elements In this example, the scaling factor of two for the change in width (i.e., the X dimension) would be applied the position, but not the size of the inlet and outlet sub-elements 130c, 132c. The various other sub-elements of the tank composite shape 122c may include scaling parameters 126, as described above, and the Scaling Canvas 124 may wholly or partially apply the scaling factor to these sub-elements, as well.

Any of the composite shapes may also include animations and/or actions and event handler scripts associated therewith, and such animations or actions may be shown in a action/animation view 134 of the editor 112. When a composite shape includes animations or actions, these animations or actions may be indicated in the hierarchy 118 with special symbols such as stars, etc. When selected in the hierarchy view 118, any actions or animations defined for a composite shape or a sub-element of a shape will be shown in the action/animation view 134. Actions or animations may be created and assigned by defining such actions or animations in the view 134 or by adding such actions or animations to the hierarchy view 118. When a user wishes to create or edit an action or animation, the editor 50 may provide a dialog or edit box to allow this feature to be fully specified or defined. The actions or animations may also be bound to the Scaling Canvas 124 to allow resizing without distortion at both configuration and runtime, as herein described. Of course, actions or animations may be defined using scripts, visual triggers or other programs. In some embodiments, the actions, animations, and event handler scripts do not account for the scaling functions as described herein. Rather, the scaling may be applied to the shape after execution of an animation, action, or event handler script, thus simplifying the user's experience.

In other embodiments, the scaling parameters 126 may be included as part of each sub-element's definition to create a common framework for all composite shapes. For example, one or more base classes for each shape or sub-element may contain the common parameters of the shapes (i.e., name, x and y positions, height, width, rotation, etc.), as well as the scaling parameters 126. In this embodiment, the Scaling Canvas 124 is dependent on the common framework because the Scaling Canvas includes access to the scaling parameters 126 and knowledge of the particular parameters to modify for scaling the composite shape 122a without distortion. In other embodiments, the scaling parameters 126 are included as parameters of the Scaling Canvas 124. For example, the Scaling Canvas 124 may implement one or more attached parameters (e.g., X Dimension, Y Dimension, Z Dimension, Width, Height, Corner Radius X, Corner Radius Y, Corner Radius Z, Font Size, Edge Width, etc.). In this embodiment, native parameters of the sub-elements 123 (e.g., X, Y, Width, Height, etc.) are bound to the attached parameters of the Scaling Canvas 124. In a further embodiment, both the sub-elements 123 and the Scaling Canvas 124 include the one or more scaling parameters 126 and the Scaling Canvas 124 may apply its attached parameters, including any scaling parameters 126, unless explicitly overridden by a sub-element parameter. Regardless of the whether the scaling parameters 126 are attached to the sub-elements 123, the Scaling Canvas 124, or both, the Scaling Canvas may use these parameters to correctly scale its contained child sub-elements 123.

Each scaling and definition parameter 126, 128 may also include a number of values and settings that are used when resizing a composite shape 122a. In some embodiments, the composite shape 122a implements an interface to allow the Scaling Canvas to access the scaling parameters 126. This approach means that the composite shape and each sub-element contains its scaling logic. By including the interface and Scaling Canvas, dependencies of the Scaling Canvas to the shapes may be reduced as the Scaling Canvas need not be aware of any of the scaling parameters 126. Reducing the Scaling Canvas dependencies is different from the WPF pattern of Panels, wherein the logic for displaying the elements contained by the Panel is always defined in the Panel itself. For each definition parameter 128, for example, a baseline/unscaled height value 130 and a baseline/unscaled width value 132 may be assigned to the sub-element upon its creation. For each scaling parameter 126, one or more values or settings may be assigned depending on the desired behavior of the object during resizing.

FIGS. 6a, 6b, and 6c illustrate example screen displays created by the graphic editor 112 of FIGS. 5a, 5b, and 5c and used at runtime within one or more of the displays 87 (FIG. 3), for example, a configuration display, a control operator display, a maintenance display and a simulation display, to name but a few. In one embodiment, a graphical display 150 of FIGS. 6a, 6b, and 6c may include one representation of a portion of an area 152 or other portion of a process control plant. For example, the graphic display 150 may include a runtime illustration of a Reactor area of a process control plant within a display 87 of an operator workstation 37 (FIG. 1). The area 152 may include the previously-configured illustrations of a tank 154a, a storage area 156, various inlets 158 and outlets 160, pipes 162, valves, fittings, etc., that represent the physical portions of the Reactor area. As previously described, the various shapes within the area 152 may be nested.

The runtime shapes may include the scaling parameters that determine how the shapes will behave upon a runtime user executing a resizing action, as described herein in relation to FIGS. 5a, 5b, and 5c. For example, scaling parameters may define or control what, if any, effect the resizing action may have on the sub-elements of the composite shapes, as further explained herein. In some embodiments, the previously described configured scaling parameters are bound to the configured composite shape at runtime.

At runtime, a resizing action may include the user or operator customizing the display by moving a slider bar or resizing a window including the display, thus resizing its composite shapes. Upon initiating a resizing action, the logic of the scaling canvas container that is included in the runtime illustration of the configured composite shape may determine a scaling factor from the baseline/unscaled parameters and scaling parameters that were configured at configuration time. The factor is then applied to each sub-element of a composite shape that includes a scaling parameter corresponding to a changed characteristic or dimension during a resizing action. For example, if the window or display 150 is resized in a horizontal, length, or X dimension, then the logic may determine a horizontal, length, or X-dimension scaling factor, and if the composite shape 122a is resized in a vertical, height, or Y dimension, then the logic may determine a vertical, height, or Y-dimension scaling factor, as previously described. The Scaling Canvas container may also include logic to implement the scaling parameters as attached properties at runtime. The resizing action may iterate through the children of the composite shape (i.e., the remaining sub-elements) to apply the scaling factor(s) to each sub-element to create an undistorted, resized rendering of the original composite shape 154a.

With reference to FIG. 6b, a runtime resizing action may include increasing the height of a window including a graphic display 150. After the resizing action, as illustrated in FIG. 6b, some sub-elements of the composite shapes within the "Reactor-1" area 152 of the display 150 are increased in height by the scaling factor that was set at configuration time, while others are not. For example, the size of a storage area 156b, an inlet sub-element 158b, and an outlet sub element 160b were configured to remain unchanged upon executing a resizing action at runtime, as illustrated in FIG. 6b. Also, while an overall position of the inlet and outlet sub-elements on the tank changes from shape 154a to shape 154b, the relative position of these sub-elements as being in the middle of the tank shape does not change. As previously described, both the inlet and outlet sub-elements were configured to include at least a Size and a Position scaling parameter that determines the sub-element's behavior upon resizing. For example, the Size scaling parameter may have been set to "None" while the Position scaling parameter may have been set to "X and Y" or "Y." Thus, in the above example, the scaling factor of two for the change in height (i.e., the Y dimension) would be applied the position, but not the size of the inlet and outlet sub-elements. Likewise, the scaling parameters, if any, of the storage area 156a composite shape may have been set to reflect no changes upon executing a runtime resizing action.

Of course, the display 150 may be resized in a variety of dimensions (e.g., the width, length, or X dimension, as illustrated in FIG. 6c). As previously described, upon executing a resizing action, the unscaled widths of each composite shape within the display 150 may be compared to the definition widths to calculate a scaling factor for each sub-element that was previously configured to include a scaling parameter. For example, with reference to FIG. 5c, a width scaling factor may be applied iteratively to those composite shape sub-elements that include a width scaling parameter (e.g., the tank 154c composite shape and sub-elements). In this example, the scaling factor of two for the change in width (i.e., the X dimension) would be applied the position, but not the size of the inlet and outlet sub-elements 158c, 160c. The various other composite shapes and associated sub-elements of the display 150 may include scaling parameters, as described above, and the scaling factor may wholly or partially be applied to these composite shapes and sub-elements, as well.

With reference to FIGS. 5a-5c, FIGS. 6a-6c, and FIG. 7, a method 175 may describe one or more routines to resize a composite shape 122a without distortion in both a configuration time and runtime environment. The method 175 may be employed during configuration of one or more graphic displays as depicted in FIGS. 5a, 5b, and 5c, or in a runtime environment as depicted in FIGS. 6a, 6b, and 6c. For example, at configuration time when a user is creating an operator display and configuring various composite shapes 122a within a graphic editor 112, the method 150 may resize a shape without distortion to produce an accurate representation of a process control plant. Also, at runtime when an operator is manipulating an operator display 150 at a workstation of the process control plant, the operator may resize the operator display, or resize various portions of the operator display for personal customization, and the method 150 may resize the composite shapes in the runtime environment. Generally, routines 156-166 described below may occur during a resizing action while positioning composite shapes on a graphic display at configuration time and during a resizing action while an operator is viewing the graphic display at runtime.

At routine 176, the method 175 may configure one or more scaling parameters 126 for a sub-element 123 of a composite shape 122a. As previously described, the scaling parameters 126 may define one or more characteristics of a sub-element that may be modified during a resizing action performed on a corresponding composite shape. The scaling parameters 126 may include any characteristic of the sub-element or the composite shape that may be changed by a resizing action (e.g., one or more of a position, a size, an edge width, a font size, a corner radius, etc.). For example, configuration of a scaling parameter may include setting a scaling parameter to restrict an X-dimension position of a sub-element during resizing of an associated composite shape's width (i.e., x-dimension) or locking a font size of a text object sub-element while anchoring the object to a region or portion of the composite shape. Of course, many other configurations are possible, including allowing a rectangle to increase or decrease in one dimension during resizing while restricting its resizing in another dimension, allowing a corner radius of a triangle to resize in an x-dimension, but not in a y-dimension, etc. The one or more scaling parameters 126 may be bound to the one or more sub-elements 123 such that the scaling parameters 126 are also implemented at runtime. As previously described, one or more of the scaling parameters and the scaling logic may be included with the sub-elements themselves (i.e., a common framework for all shapes), or may be incorporated into the Scaling Canvas (i.e., the scaling parameters are included as attached properties of the Scaling Canvas). Regardless, the Scaling Canvas does not need to be aware of the scaling parameters associated with each specific shape or sub-element.

At routine 178, a user, application, or other entity may configure a composite shape. The composite shape may be placed on or contained within a Scaling Canvas 124, as previously described. For example, as a composite shape is being created, one or more sub-elements may be placed within a Scaling Canvas container. These sub-elements may be resized and positioned within the Scaling Canvas as desired by the user. Once the size, position, and other parameters of the sub-element are finalized within the Scaling Canvas container, the method 175 may retrieve and store the baseline or "unscaled" parameters at routine 180. These unscaled parameters may be used as the basis for computing new dimensions of a composite shape during a later resizing action.

At routine 182, the method 175 may compute one or more scaling factors for the composite shape. In one embodiment, the scaling factor is a ratio of an unscaled parameter (as stored at routine 180) to a value of a composite shape's defined parameter. For example, as the composite shape 122*a* is resized, the scaling canvas will be changed by a factor in one or more dimensions. Thus, if the composite shape is doubled in size in a Y dimension, then the scaling factor for that resizing action will be two. Of course, the scaling factors may be calculated for any resized dimension of the composite shape (e.g., an X dimension, a Z dimension, etc.).

At routine 184, the method 175 may iterate to each sub-element of the composite shape in preparation of applying the scaling factor computed at routine 182. In some embodiments, the method 175 may iterate to each sub-element of the composite shape. For example, the method 175 may determine whether or not the sub-element includes a scaling parameter at routine 186. In other embodiments, the method 175 may only iterate to those sub-elements that include one or more of the scaling parameters, as previously discussed. For example, the method 175 may determine which of the composite shape's sub-elements include a scaling parameter before iterating to a sub-element or before another of the previously-described routines. Regardless of when the method 175 determines whether a sub-element includes one or more scaling parameters, the method 175 may scale the sub-element at routine 188. In some embodiments, the method scales the sub-element by applying the scaling factor to the unscaled dimension that corresponds to the resizing dimension of the composite shape. For example, if the method 175 computed a scaling factor of two at routine 182 for a resizing in an X dimension, the sub-element included an unscaled X dimension of one hundred and a scaling parameter that permitted the resizing in the X dimension, then the scaled value of the X dimension for the sub-element would be two hundred. If, however, the sub-element did not include a scaling parameter or included a scaling parameter that did not permit resizing in the X dimension, then the method 175 may not resize the sub-element at routine 190. If the sub-element does not include a scaling parameter, the method 175 may proceed to routine 190.

At routine 190, the method 175 may determine whether or not the composite shape includes one or more sub-elements that have not been scaled. In some embodiments, the method 175 may include only those sub-elements that also include a scaling parameter in the determination of whether one or more sub-elements have been scaled at routine 190. In other embodiments, the method 175 may include all sub-elements or one or more other subsets of the sub-elements in the determination at routine 190. If there are no sub-elements that have not been scaled 188 or are otherwise remaining to be checked or resized by the method, then the method may end. If more sub-elements remain, then the method may return to routine 184 to re-iterate the previously-described routines.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A computer program comprising a non-transitory computer-readable storage medium having a computer-readable program code embodied therein, the computer-readable program code adapted to be executed to implement a method for scaling composite shapes for an operator display in a process control system for use in a process plant, the method comprising:

displaying a composite shape that graphically illustrates an entity within the process plant, the composite shape including a sub-element having an unscaled parameter and a scaling parameter, wherein each scaling parameter includes values that each correspond to a dimension of the sub-element and define a resizing behavior of a corresponding sub-element;

resizing the composite shape and the composite shape sub-element in one or more dimensions;

calculating a scaling factor for each resized dimension of the composite shape, wherein the scaling factor for each resized dimension of the composite shape is a ratio between the unscaled parameter of the sub-element corresponding to the resized dimension of the composite shape and the resized dimension of the composite shape;

determining the resizing behavior for the sub-element based on the values of the sub-element scaling parameter; and applying the calculated scaling factor to each sub-element unscaled parameter according to the determined resizing behavior, wherein each resizing behavior determines how the calculated scaling factor is applied directly to each sub-element to prevent distortion of the sub-element resulting from resizing the composite shape and the sub-element in one or more dimensions, and the unscaled parameter corresponds to the resized dimension.

2. The program of claim 1, wherein displaying the composite shape includes displaying the sub-element within a scaling canvas.

3. The program of claim 2, wherein resizing the composite shape in one or more dimensions includes resizing the scaling canvas that contains the sub-element.

4. The program of claim 3, wherein the class includes a Canvas class.

5. The program of claim 2, wherein the scaling canvas includes an extension of a Windows Presentation Foundation class.

6. The program of claim 1, wherein each scaling parameter controls a scaling behavior of a corresponding sub-element.

7. The program of claim 1, wherein the unscaled parameter includes one or more of a font size, an edge width, a corner radius, a width, a height, and a position.

8. The program of claim 1, wherein the unscaled parameter includes a baseline value for applying the scaling parameter.

9. The program of claim 1, wherein the scaling canvas includes the one or more scaling parameters.

10. The program of claim 1, further comprising, at configuration time, configuring each composite shape and scaling parameter and, at runtime, binding each configured composite shape to a configured scaling parameter.

11. The program of claim 1, wherein resizing the composite shape in one or more dimensions occurs at one or more of a configuration time and a runtime.

12. The program of claim 1, wherein calculating the scaling factor for each resized dimension occurs at one or more of a configuration time and a runtime.

13. The program of claim 1, wherein applying one or more scaling factors to each unscaled parameter occurs at one or more of a configuration time and a runtime.

14. A graphic display editor for use in a process plant to resize a composite shape that represents one or more of an operation and an entity within the process plant, the graphic display editor comprising:
 a memory and a processor;
 a library of composite shapes stored in the memory, wherein each of the composite shapes includes a different visual representation of a physical or a logical entity within the process control plant, a sub-element having an unscaled parameter, and a scaling parameter;
 a graphically based editor canvas routine including instructions stored in the memory for execution by the processor that enable a user to define an executable graphic display, wherein a first instruction places indications of one or more composite graphic objects from the library of composite graphic objects onto an edit canvas to define a manner in which visual representations of the composite graphic objects will be displayed on a display device to a user during execution of the graphic display, and a second instruction controls a scale behavior of each of the component objects of the composite graphic object;
 a scaling canvas routine including instructions stored in the memory for execution by the processor to associate a scaling parameter with a sub-element of a composite shape, wherein each sub-element of the composite shape is contained within a scaling canvas object and each scaling parameter includes values that each correspond to a dimension of the sub-element and define a scaling behavior of a sub-element associated with the composite shape; and
 a composite shape resizing routine including instructions stored in the memory for execution by the processor to:
  modify one or more dimensions of the composite shape and the composite shape sub-element within the editor canvas,
  calculate a scaling factor for each modified dimension of the composite shape, wherein the scaling factor for each modified dimension of the composite shape is a ratio between the unscaled parameter of the sub-element corresponding to the modified dimension of the composite shape and the modified dimension of the composite shape,
  determine the scaling behavior for the sub-element based on the values of the sub-element scaling parameter, and
  apply the calculated scaling factor to each sub-element unscaled parameter of the composite shape according to the associated scaling parameter, wherein each determined scaling behavior determines how the calculated scaling factor is directly applied to each sub-element to prevent distortion of the sub-element resulting from modification of one or more dimensions of the composite shape and the composite shape sub-element within the editor canvas, and the unscaled parameter corresponds to the modified dimension.

15. The graphic display object of claim 14, wherein the scaling canvas object includes the scaling parameters.

16. The graphic display editor of claim 14, wherein the scaling behavior of each of the sub-elements defines a degree to which the modification is applied to a corresponding dimension of a sub-element.

17. The graphic display editor of claim 14, wherein the scaling parameter includes one or more of a text font, a sub-element border thickness, a position of the sub-element within the composite shape, a size of the sub-element, and a corner radius of the sub-element.

18. The graphic display editor of claim 14, wherein the scaling parameter eliminates distortion of the sub-element upon execution of the composite shape resizing routine.

19. The graphic display editor of claim 14, wherein the scaling parameter enables a text box sub-element of the composite shape to remain a consistent font size and position relative to another sub-element of the composite shape during execution of the composite shape resizing routine.

20. The graphic display editor of claim 14, wherein the scaling parameter enables a sub-element border thickness of the composite shape to remain a consistent thickness and position relative to another sub-element of the composite shape during execution of the composite shape resizing routine.

21. The graphic display editor of claim 14, wherein the composite shape resizing routine includes a further instruction to enable the scaling canvas object to calculate a scaling factor that includes a ratio of one or more resized dimensions of the scaling canvas to one or more corresponding unscaled parameters.

22. The graphic display editor of claim 21, wherein the corresponding unscaled parameters include original parameters of the composite shape including one or more of a text object font size, a sub-element edge width, a sub-element corner radius, a sub-element width, a sub-element height, and a sub-element position relative to other sub-elements of the composite shape.

23. The graphic display editor of claim 21, wherein the composite shape resizing routine includes further instructions to enable the scaling canvas object to apply the scaling factor to one or more dimensions of one or more sub-elements of the composite shape and each of the sub-elements includes one or more scaling parameters.

24. A computer system for use in a process control plant including a memory for storing computer-executable instructions, a processor for executing the instructions, and a display for displaying composite shapes in a graphical representation of the process control plant, each composite shape representing one or more of an operation and an entity within the process plant, the system comprising:
- a database including composite shapes each having a sub-element within a scaling canvas object, wherein each sub-element includes an unscaled parameter and a scaling parameter; and
- a graphical human-machine interface for displaying the graphical representation of the process plant, the interface including a composite shape resizing module having computer-executable instructions for:
  configuring, at configuration time, a composite shape and a scaling parameter corresponding to a sub-element of the composite shape and, at runtime, binding the configured composite shape to the configured scaling parameter, wherein the configured scaling parameter includes values that each correspond to a dimension of the sub-element and define a resizing behavior of the sub-element of the composite shape;
  displaying a resized scaling canvas object of the composite shape, the resized scaling canvas object including one or more changed dimensions of the sub-element of the composite shape;
  calculating a scaling factor for each changed dimension of the resized scaling canvas object, wherein the scaling factor includes a ratio of one or more changed dimensions of the scaling canvas object to one or more corresponding unscaled parameters of the sub-elements;
  determining the resizing behavior for the sub-element based on the values of the sub-element scaling parameter; and
  applying the calculated scaling factor to each sub-element unscaled parameter according to the determined resizing behavior, wherein each resizing behavior determines how the calculated scaling factor is applied directly to each sub-element to prevent distortion of the sub-element resulting the one or more changed dimensions of the sub-element of the composite shape, and the unscaled parameter corresponds to the changed dimension.

25. The computer system of claim 24, wherein the scaling canvas object includes an extension of a Windows Presentation Foundation Canvas class.

26. The computer system of claim 24, wherein the composite shape resizing module further includes computer-executable instructions for controlling a scaling behavior of a corresponding sub-element of the composite shape using the scaling parameter.

27. The computer system of claim 24, wherein the unscaled parameter includes a baseline value corresponding to one or more dimensions of each sub-element.

28. The computer system of claim 24, wherein the scaling parameter corresponds to one or more of a text object font size, a sub-element edge width, a sub-element corner radius, a sub-element width, a sub-element height, and a sub-element position relative to one or more other sub-elements of the composite shape.

29. The computer system of claim 24, wherein the composite shape resizing module includes computer-executable instructions for applying the scaling factor at one or more of a configuration time and a runtime.

30. The computer system of claim 24, wherein the scaling canvas object includes the scaling parameter.

31. The computer system of claim 24, wherein a sub-element of the scaling canvas object includes the scaling parameter.

32. The computer system of claim 24, wherein the sub-elements of the composite shapes include the one or more scaling parameters.

33. The computer system of claim 24, wherein displaying the resized scaling canvas object of the composite shape occurs at one or more of a configuration time and a runtime.

34. The computer program of claim 24, wherein calculating the scaling factor for each changed dimension occurs at one or more of a configuration time and a runtime.

35. The computer program of claim 24, wherein applying the calculated scaling factor to each sub-element unscaled parameter occurs at one or more of a configuration time and a runtime.

* * * * *